United States Patent
Ono et al.

(10) Patent No.: US 11,286,166 B2
(45) Date of Patent: Mar. 29, 2022

(54) METHOD FOR PRODUCING GRAPHITE OXIDE

(71) Applicant: NIPPON SHOKUBAI CO., LTD., Osaka (JP)

(72) Inventors: Hironobu Ono, Hyogo (JP); Osamu Konosu, Osaka (JP); Shin-ichi Okuoka, Osaka (JP); Syun Gohda, Osaka (JP); Shusuke Kamata, Hyogo (JP); Yuichi Sato, Osaka (JP); Yuta Nishina, Okayama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 637 days.

(21) Appl. No.: 15/775,285

(22) PCT Filed: Nov. 8, 2016

(86) PCT No.: PCT/JP2016/083141
§ 371 (c)(1),
(2) Date: May 10, 2018

(87) PCT Pub. No.: WO2017/082262
PCT Pub. Date: May 18, 2017

(65) Prior Publication Data
US 2018/0319668 A1    Nov. 8, 2018

(30) Foreign Application Priority Data

Nov. 11, 2015 (JP) .............................. JP2015-221470
Nov. 11, 2015 (JP) .............................. JP2015-221471
(Continued)

(51) Int. Cl.
*C01B 32/198*        (2017.01)
*C01B 32/23*         (2017.01)
(Continued)

(52) U.S. Cl.
CPC ............ *C01B 32/23* (2017.08); *C01B 32/192* (2017.08); *C01B 32/198* (2017.08); *B82Y 40/00* (2013.01);
(Continued)

(58) Field of Classification Search
CPC ......... C01B 32/23; B82Y 30/00; B82Y 40/00; C01P 2002/72; C01P 2002/82; C01P 2002/85
See application file for complete search history.

(56) References Cited

U.S. PATENT DOCUMENTS

2002/0022122 A1   2/2002   Hirata et al.
2006/0293443 A1   12/2006  Reinheimer et al.
(Continued)

FOREIGN PATENT DOCUMENTS

CN    102153075 B  *  6/2013
CN    103570007       2/2014
(Continued)

OTHER PUBLICATIONS

Ankamwar, Balaprasad, and Farah Surti. "Water soluble graphene synthesis." Chem Sci Trans 1.3 (2012): 500-507.*
(Continued)

*Primary Examiner* — Richard M Rump
(74) *Attorney, Agent, or Firm* — Hamre, Schumann, Mueller & Larson, P.C.

(57) ABSTRACT

The present invention provides a safe and highly efficient method for producing graphite oxide. The present invention relates to a method for producing graphite oxide by oxidizing graphite, the method including the step of oxidizing graphite by adding a permanganate to a liquid mixture containing graphite and sulfuric acid while maintaining the concentration of heptavalent manganese at 1% by mass or less in 100% by mass of the liquid mixture.

20 Claims, 12 Drawing Sheets

(30) Foreign Application Priority Data

Jan. 21, 2016 (JP) .............................. JP2016-009845
Mar. 8, 2016 (JP) .............................. JP2016-044584

(51) Int. Cl.
*C01B 32/192* (2017.01)
*B82Y 40/00* (2011.01)

(52) U.S. Cl.
CPC ...... *C01P 2002/72* (2013.01); *C01P 2002/82* (2013.01); *C01P 2002/85* (2013.01)

(56) References Cited

U.S. PATENT DOCUMENTS

| | | | |
|---|---|---|---|
| 2012/0064409 A1* | 3/2012 | Zhamu | H01M 4/13 429/221 |
| 2014/0275684 A1* | 9/2014 | Bielawski | B01J 21/185 585/653 |
| 2015/0111449 A1 | 4/2015 | Cruz-Silva et al. | |

FOREIGN PATENT DOCUMENTS

| | | | | |
|---|---|---|---|---|
| CN | 104617300 A | * | 5/2015 | ............. C01B 32/23 |
| CN | 105621403 A | * | 6/2016 | |
| EP | 2 639 201 | | 9/2013 | |
| JP | 2002-053313 | | 2/2002 | |
| JP | 2010-102829 | | 5/2010 | |
| JP | 2011-148701 | | 8/2011 | |
| JP | 2011-213583 | | 10/2011 | |
| JP | 2013-079176 | | 5/2013 | |
| JP | 2014-125406 | | 7/2014 | |
| KR | 10-2014-0028381 | | 3/2014 | |
| KR | 10-2015-0122316 | | 11/2015 | |
| WO | 2015/109916 | | 7/2015 | |

OTHER PUBLICATIONS

Yuan, Fang-Yuan, et al. "In situ chemical reduction and functionalization of graphene oxide for electrically conductive phenol formaldehyde composites." Carbon 68 (2014): 653-661.*

Dimiev, Ayrat M., and James M. Tour. "Mechanism of graphene oxide formation." ACS nano 8.3 (2014): 3060-3068.*

Hummers, et al., "Preparation of Graphitic Oxide", J. Am. Chem. Soc., Mar. 20, 1958, 80(6), p. 1339.

Kovtyukhova, et al., "Layer-by-layer Assembly of Ultrathin Composite Films from Micron-Sized Graphite Oxide Sheets and Polycations", Chem. Mater., 1999, 11, pp. 771-778.

Marcano, et al., "Improved Synthesis of Graphene Oxide", ACS Nano, vol. 4, No. 8, 2010, pp. 4806-4814.

Ceriotti, et al., "Rapid method for the purification of graphene oxide", RSC Adv., 2015, 5, pp. 50365-50371.

Ceriotti, et al., Rapid Method for the Purification of Graphene Oxide (Supporting Information), Nanoscale, 2015, 00, SI, pp. 1-8.

* cited by examiner

METHOD FOR PRODUCING GRAPHITE OXIDE

TECHNICAL FIELD

The present invention relates to a method for producing graphite oxide, specifically relates to a method for producing graphite oxide that is suitable for catalysts (catalyst materials), electrode materials for cells and capacitors, thermoelectric conversion materials, conductive materials, light emitting materials, lubricant additives (lubricating materials), additives for polymers, permeable membrane materials, oxidants, bactericidal agents, antimicrobial agents (antimicrobial materials), water repellent materials, and adsorption materials.

BACKGROUND ART

Graphite oxide is prepared by oxidizing graphite, which has a layered structure in which carbon atoms are bonded to each other through $sp^2$ bonding and arranged in planes, and is provided with an oxygen functional group. Numerous studies have been conducted on graphite oxide for its unique structure and properties. Graphite oxide is expected to be used as catalysts (catalyst materials), electrode materials for cells and capacitors, thermoelectric conversion materials, conductive materials, light emitting materials, lubricant additives, additives for polymers, permeable membrane materials, oxidants, bactericidal agents, antimicrobial agents, water repellent materials, or adsorption materials.

As a method for producing graphite oxide, a method in which graphite oxide is synthesized by reacting graphite with a strong oxidant in an acid solvent and the resulting graphite oxide is separated and purified from the solution is generally used, and the Hummers method is known in which graphite is oxidized by adding potassium permanganate as an oxidant to the reaction system under ice cooling (see Non-Patent Document 1). Further, the safety and the qualities of graphite oxide are tried to be enhanced by improving such a method (see Patent Documents 1 and 2, Non-Patent Documents 2 and 3). Other known methods for producing graphite oxide include, for example, the Brodie method in which nitric acid and potassium chlorate are used and the Staudenmaier method in which sulfuric acid, nitric acid, and potassium chlorate are used as oxidants. The resulting graphite oxide is generally separated and purified from the solution by centrifuging or filtering the reaction liquid containing graphite oxide. Filtering under gas pressure has been reported as a method for efficiently separating and purifying graphite oxide (see Non-Patent Documents 4 and 5).

CITATION LIST

Patent Document
Patent Document 1: JP 2011-148701 A
Patent Document 2: JP 2002-53313 A
Non-Patent Document
Non-Patent Document 1: William S. Hummers, et al., Journal of American Chemical Society, 1958, 80, 1339
Non-Patent Document 2: Nina I. Kovtyukhova, et al., Chemistry of Materials, 1999, 11, 771-778
Non-Patent Document 3: Daniela C. Marcano, et al., ACS NANO, 2010, 4, 8, 4806-4814
Non-Patent Document 4: Gabriel Ceriotti, et al., RSC Advances, 2015, 5, 50365
Non-Patent Document 5: Gabriel Ceriotti, et al., Nanoscale, 2015, 00, SI, pp. 1-8

SUMMARY OF INVENTION

Technical Problem

There is room for improvement in conventional methods for producing graphite oxide in terms of both the safety and the efficiency. In particular, there is room for improvement in the case of mass-production of graphite oxide on an industrial scale for achieving highly efficient (short-time) production of graphite oxide while the safety is sufficiently ensured.

The present invention has been made in view of the state of the art, and aims to provide a safe and highly efficient method for producing graphite oxide.

Solution to Problem

The present inventors examined various methods for producing graphite oxide, and focused on a method for producing graphite oxide with high efficiency by adding a permanganate to a liquid mixture containing graphite and sulfuric acid. The present inventors found that in conventional methods in which a permanganate is added to a liquid mixture containing graphite and sulfuric acid under ice cooling, explosive heptavalent manganese is accumulated in the reaction system if appropriate measures are not taken, and therefore a risk of explosion increases particularly when an oxidation reaction is performed on an industrial scale. For such a problem, the present inventors found that graphite oxide can be safely produced with high efficiency by adding a permanganate while maintaining the concentration of heptavalent manganese low by, for example, monitoring the consumption of heptavalent manganese in the liquid mixture.

That is, the present invention relates to a method for producing graphite oxide by oxidizing graphite, the method including the step of oxidizing graphite by adding a permanganate to a liquid mixture containing graphite and sulfuric acid while maintaining the concentration of heptavalent manganese at 1% by mass or less in 100% by mass of the liquid mixture. Hereinafter, the method according to this method for producing graphite oxide is also referred to as a first aspect of the present invention.

Advantageous Effects of Invention

The method for producing graphite oxide of the present invention has the above structure, enables safe and highly efficient production of graphite oxide, and is suitable for mass production.

DESCRIPTION OF EMBODIMENTS

Figure 1:
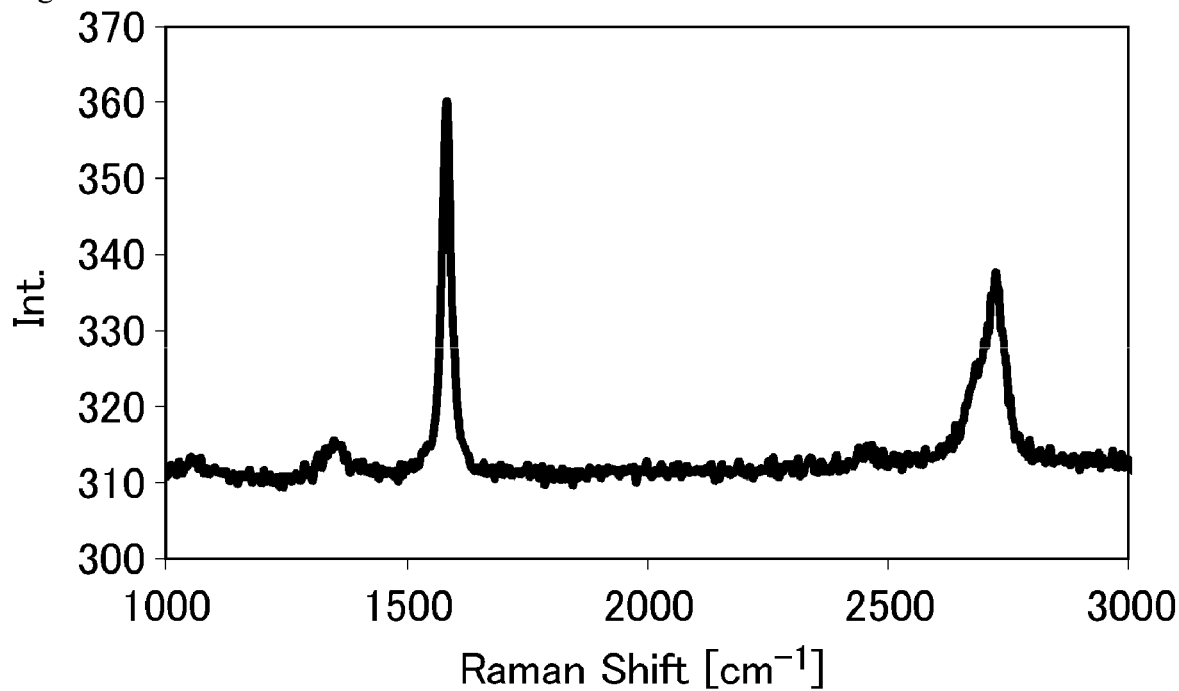
FIG. 1 is a graph of the Raman spectrum of natural graphite used as a raw material in Example 1-1.

The present invention is described in detail below.

The following describes preferred features in paragraphs, and the embodiments of any combinations of two or more of the preferred features are also preferred embodiments of the present invention.

In the following, unless otherwise stated, "the present invention" means the "first aspect of the present invention", but the preferred embodiments of the first aspect of the present invention shall apply to second to fourth aspects of the present invention described later.

<Method for Producing Graphite Oxide>

The graphite oxide obtained by the production method of the present invention is formed by bonding oxygen to a graphitic carbon material such as graphene or graphite, and contains an oxygen-containing functional group such as an epoxy group, carboxyl group, carboxylic acid salt group, or hydroxy group. The graphite oxide is preferably graphene oxide in which oxygen is bonded to the carbon of graphene.

Although the graphite oxide may further contain any other functional group such as a sulfur-containing group, the percentage of carbon, hydrogen, and oxygen as constituent elements is preferably 97 mol % or more, more preferably 99 mol % or more relative to all the constituent elements. Also, the graphite oxide may preferably consist of only a carbon atom, and an oxygen atom, a hydrogen atom, and a salt-forming alkali metal atom of an oxygen-containing functional group as constituent elements.

Generally, graphene refers to a sheet in which carbon atoms are bonded to each other through $sp^2$ bonding and arranged in a planar single layer, and a laminate of a large number of such graphene sheets refers to graphite. The graphene oxide in the present invention encompasses not only a sheet consisting of a single layer of carbon atoms, but also a laminate of about 2 to 100 layers. The graphene oxide is preferably in the form of a sheet consisting of a single layer of carbon atoms or in the form of a laminate of about 2 to 20 layers.

(Oxidation Step)

The method for producing graphite oxide of the present invention includes the step of oxidizing graphite by adding a permanganate to a liquid mixture containing graphite and sulfuric acid while maintaining the concentration of heptavalent manganese at 1% by mass or less in 100% by mass of the liquid mixture.

The phrase "while maintaining the concentration of heptavalent manganese at 1% by mass or less" means that the average concentration of the heptavalent manganese in the liquid mixture containing graphite and sulfuric acid is maintained at 1% by mass or less when the liquid mixture is homogenized by stirring.

The heptavalent manganese includes not only heptavalent manganese in the form of ions, but also heptavalent manganese contained in, for example, oxides.

In the oxidation step, the concentration of the heptavalent manganese is maintained at preferably 0.9% by mass or less, more preferably 0.8% by mass or less, still more preferably 0.7% by mass or less, particularly preferably 0.5% by mass or less.

Although the lower limit of the concentration of the heptavalent manganese is not limited, it is a preferred embodiment of the method for producing graphite oxide of the present invention that the concentration is maintained at, for example, 0.0001% by mass or higher in order to efficiently promote the oxidation reaction.

The concentration of the heptavalent manganese is determined by the method described in the following examples. The measurement of the concentration of the heptavalent manganese may be skipped when the concentration of the heptavalent manganese in the liquid mixture is maintained at 1% by mass or less during the oxidation step by controlling conditions, for example, for reaction and for adding a permanganate. Preferably, the measurement of the concentration is performed once or multiple times during the oxidation step.

Examples of the permanganate added in the oxidation step include sodium permanganate, potassium permanganate, ammonium permanganate, silver permanganate, zinc permanganate, magnesium permanganate, calcium permanganate, and barium permanganate. One or two or more of these may be used. Preferred among these are sodium permanganate and potassium permanganate, and more preferred is potassium permanganate.

In the below-described second to fourth aspects of the present invention, any oxidant may be added in the oxidation step. Examples of the oxidant include nitrates, hypochlorites, and chromates in addition to permanganates. One or two or more of these may be used. Preferred among these are permanganates. The permanganates are the same as those mentioned above.

In another preferred embodiment of the method for producing graphite oxide of the present invention, the total amount of the permanganate added in the oxidation step is 50% to 500% by mass for 100% by mass of the graphite in the liquid mixture.

Thus, graphite oxide can be safely and efficiently produced. The amount of oxygen atoms to be introduced in the graphite oxide can be controlled by varying the total amount of the permanganate.

The total amount is more preferably 100% by mass or more, still more preferably 150% by mass or more, further preferably 200% by mass or more, particularly preferably 240% by mass or more. The total amount is more preferably 450% by mass or less, still more preferably 400% by mass or less, further preferably 350% by mass or less, particularly preferably 300% by mass or less.

The amount of the graphite in the liquid mixture herein refers to the amount of the graphite supplied for the production of the liquid mixture.

In another preferred embodiment of the method for producing graphite oxide of the present invention, the permanganate is added in multiple portions or continuously added in terms of the safety in the oxidation step. When the permanganate is added in multiple portions, it is added preferably in three or more portions, more preferably in five or more portions, still more preferably in seven or more portions, particularly preferably in nine or more portions. Thus, the concentration of the heptavalent manganese in the liquid mixture can be easily maintained low, and rapid progress of the oxidation reaction is suppressed. Thereby, the reaction is more easily controlled. When the permanganate is added in multiple portions, the concentration of heptavalent manganese is preferably measured in order to determine the time interval between additions which allows the concentration of the heptavalent manganese in the liquid mixture to be maintained at a desired concentration. The time interval between additions refers to a time interval from the end of one addition to the start of the subsequent addition.

When the permanganate is added in multiple portions in the oxidation step, the amounts of the respective portions may be the same or different, and are preferably the same as each other.

When the permanganate is added in three or more portions in the oxidation step, the time intervals between additions may be the same as or different from each other, and are preferably the same as each other.

In another preferred embodiment of the method for producing graphite oxide of the present invention, in the oxidation step, the amount of the permanganate in each portion is 3% by mass or less for 100% by mass of the sulfuric acid in the liquid mixture. The amount is more preferably 2% by mass or less, still more preferably 1% by mass or less, particularly preferably 0.5% by mass or less.

When the permanganate is added in multiple portions and the amounts of the respective portions are different from each other, the maximum value of the amount has only to fall within the above preferred range.

The amount of the sulfuric acid in the liquid mixture refers to the amount (excluding water) of sulfuric acid supplied for preparation of the liquid mixture.

In the oxidation step, the permanganate may be added while the temperature of the liquid mixture is maintained within the range of −10° C. to 60° C. The temperature of the liquid mixture is preferably maintained at 0° C. or higher.

In another preferred embodiment of the method for producing graphite oxide of the present invention, in the oxidation step, the permanganate is added while the temperature of the liquid mixture is maintained within the range of 10° C. to 50° C. Within such a temperature range, the oxidation reaction can sufficiently proceed under the control of the reaction. Specifically, at a temperature maintained at 10° C. or higher, the heptavalent manganese in the liquid mixture can be reacted and consumed. Therefore, the heptavalent manganese is prevented from accumulating in the reaction system, and the concentration of the heptavalent manganese can be maintained low. Further, at a temperature maintained at 50° C. or lower, the oxidation step can be more safely performed.

The temperature is maintained more preferably at 12° C. or higher, still more preferably at 15° C. or higher, further preferably at 18° C. or higher, particularly preferably at 20° C. or higher. Further, the temperature is maintained more preferably at 45° C. or lower, still more preferably at 40° C. or lower.

In another preferred embodiment of the method for producing graphite oxide of the present invention, the oxidation step is a step of adding a permanganate while maintaining the temperature variation of the liquid mixture within 25° C. Thus, the oxidation step can be performed more stably.

In the oxidation step, the temperature variation is maintained more preferably within 20° C., still more preferably within 15° C., particularly preferably within 10° C.

Further, in another preferred embodiment of the method for producing graphite oxide of the present invention, the permanganate is added over 10 minutes to 10 hours in the oxidation step in order to stably perform the oxidation step.

In the oxidation step, the permanganate is more preferably added over 30 minutes or more, still more preferably added over 1 hour or more, particularly preferably added over 2 hours or more. Further, in order to efficiently produce graphite oxide, the permanganate is more preferably added over 8 hours or less, still more preferably over 7 hours or less, particularly preferably over 6 hours or less.

In another preferred embodiment of the method for producing graphite oxide of the present invention, in the oxidation step, the mass ratio of sulfuric acid to graphite (sulfuric acid/graphite) is 25 to 60 in the liquid mixture. At a mass ratio of 25 or more, an increase in viscosity of the reaction liquid (liquid mixture) is sufficiently prevented during the oxidation reaction, leading to efficient production of graphite oxide. Meanwhile, at a mass ratio of 60 or less, the amount of waste liquid can be sufficiently reduced.

The mass ratio is more preferably 26 or more, still more preferably 27 or more, particularly preferably 28 or more. The mass ratio is more preferably 54 or less, still more preferably 48 or less, particularly preferably 42 or less.

If the oxidation step is performed in the presence of a small amount of sulfuric acid, for example, the liquid mixture may be highly viscous. It may be difficult to add an oxidant to such a viscous liquid mixture. Therefore, the liquid mixture may be diluted with a small amount (for example, less than 50 parts by mass for 100 parts by mass of sulfuric acid) of water after addition of an oxidant in the oxidation step. In other words, the oxidation step may optionally include the step of diluting the liquid mixture with water to reduce the viscosity of the liquid mixture.

The following describes favorable properties of graphite used to prepare the liquid mixture.

In another preferred embodiment of the method for producing graphite oxide of the present invention, in the oxidation step, the ratio of the peak intensity of the D band to the peak intensity of the G band is 0.4 or less in the Raman spectrum of the graphite. Thus, graphene oxide is more easily obtained.

Herein, the peak intensity of the G band means the peak intensity at a Raman shift of 1580 $cm^{-1}$, and the peak intensity of the D band means the peak intensity at a Raman shift of 1350 $cm^{-1}$.

The ratio between the peak intensities is more preferably 0.35 or less, still more preferably 0.3 or less. The ratio between the peak intensities is more preferably 0.04 or more.

The ratio between the peak intensities can be determined by the method described in the following examples.

In another preferred embodiment of the method for producing graphite oxide of the present invention, the graphite used in the reaction in the oxidation step has a spacing of the (002) planes of 3.3 Å or larger and 3.4 Å or smaller determined by X-ray diffraction in crystals. Thus, graphene oxide is more easily obtained.

The spacing is more preferably 3.32 Å or larger, still more preferably 3.34 Å or larger. The spacing is more preferably 3.39 Å or smaller, still more preferably 3.38 Å or smaller.

The spacing can be determined by the method described in the following examples.

In another preferred embodiment of the method for producing graphite oxide of the present invention, in the oxidation step, the graphite has an average particle size of 3 μm or greater and 80 μm or smaller. The use of graphite with such an average particle size enables more efficient promotion of the oxidation reaction.

The average particle size is more preferably 3.2 μm or greater, still more preferably 3.5 μm or greater. The average particle size is more preferably 70 μm or smaller.

The average particle size can be determined using a particle size distribution analyzer.

The graphite used in the oxidation step may be in any form, such as in the form of fine powder, powder, grains, granules, flakes, polyhedrons, rods, or particles with a curved surface. Particles with an average particle size falling within the above range can be produced by, for example, pulverizing particles with a pulverizer; sorting particles by size with a sieve; a combination of these; or a method for preparing particles with a desired particle size by optimizing the preparation conditions of the production of particles.

In another preferred embodiment of the method for producing graphite oxide of the present invention, in the oxidation step, the graphite has a specific surface area of 3 $m^2/g$ or larger and 10 $m^2/g$ or smaller.

In order to smoothly promote the oxidation reaction, the specific surface area is more preferably 4 $m^2/g$ or larger, still more preferably 4.5 $m^2/g$ or larger. The specific surface area is more preferably 9 $m^2/g$ or smaller, still more preferably 8.5 $m^2/g$ or smaller.

The specific surface area can be determined by the nitrogen adsorption BET method using a specific surface area analyzer.

In the oxidation step, the amount of the graphite in 100% by mass of the liquid mixture containing graphite and sulfuric acid is preferably 0.5% by mass or more, more preferably 1% by mass or more, still more preferably 1.5% by mass or more, particularly preferably 2% by mass or more. The amount of the graphite is preferably 10% by mass or less, more preferably 8% by mass or less, still more preferably 7% by mass or less, particularly preferably 6% by mass or less.

In the oxidation step, the graphite may be used alone, or two or more graphites different in, for example, average particle size, form, specific surface area, or properties, may be used.

The oxidation step is preferably performed under stirring, for example, using a known stirrer.

The oxidation step may be performed in the air or in an inert gas atmosphere, such as in a nitrogen, helium, or argon atmosphere. The pressure conditions are not limited in the oxidation step, and the oxidation step may be performed under reduced pressure, atmospheric pressure, or pressure, and is preferably performed under, for example, atmospheric pressure.

The oxidation step is preferably performed for 0.1 hours or more, more preferably for 0.5 hours or more, still more preferably for 1 hour or more, particularly preferably for 2 hours or more. The oxidation step is preferably performed for 120 hours or less, more preferably for 15 hours or less, still more preferably for 10 hours or less, particularly preferably for 8 hours or less.

The oxidation step may be performed continuously or intermittently.

When the water content of the sulfuric acid used to prepare the liquid mixture is small (for example, less than 5% by mass), graphite oxide with good quality (for example, with high degree of exfoliation) can be obtained. However, in terms of the process, preferred is sulfuric acid with a water content within the range of, for example, 5% by mass or more and 15% by mass or less. It is prepared by, for example, adding some water to commercially available concentrated sulfuric acid. At a water content of 5% by mass or more, solidification of the reaction slurry can be more sufficiently prevented in the oxidation reaction, and the amount of the graphite to be supplied to the liquid mixture can be sufficiently increased. At a water content of 15% by mass or less, oxidation or exfoliation of graphite can sufficiently proceeds. The water content is more preferably 10% by mass or less.

The liquid mixture can be obtained by mixing the graphite, the sulfuric acid, and optionally other component(s). The mixing can be appropriately performed by a known method. For example, the graphite is preferably homogeneously dispersed by ultrasonication or using a known disperser.

In the following methods for producing graphite oxide of the second to fourth aspects of the present invention, graphite may be oxidized by any method as long as it is oxidized. Examples of the method for oxidizing graphite include the Hummers method, the Brodie method, and the Staudenmaier method. As described above, oxidation may be performed by adding a permanganate to the liquid mixture containing graphite and sulfuric acid utilizing the Hummers method. As just described, it is one of the preferred embodiments of the second to fourth aspects of the present invention that the oxidation step is a step of adding a permanganate to the liquid mixture containing graphite and sulfuric acid. In addition, the above-described various conditions of the oxidation step can be preferably applied to the second to fourth aspects of the present invention.

<Method of Measuring Concentration of Heptavalent Manganese>

The present invention also relates to a method of measuring the concentration of heptavalent manganese in which 1 part by mass of a liquid mixture containing heptavalent manganese is added to 10 to 10000 parts by mass of water and the absorbance is measured. Such a method enables quick and accurate measurement of the concentration of heptavalent manganese.

The amount of the water is preferably 20 parts by mass or more, more preferably 30 parts by mass or more, still more preferably 50 parts by mass or more, particularly preferably 100 parts by mass or more per 1 part by mass of the liquid mixture. The amount of the water is preferably 8000 parts by mass or less, more preferably 5000 parts by mass or less, still more preferably 3000 parts by mass or less, particularly preferably 1000 parts by mass or less.

The liquid mixture may be, for example, a strongly acidic liquid mixture containing a permanganate and a carbon material such as graphite (e.g. sulfuric acid solution).

As described above, in the method of measuring the concentration of heptavalent manganese in the present invention, quick and accurate quantification can be achieved by measurement using a liquid prepared by adding 1 part by mass of the liquid mixture containing heptavalent manganese to 10 to 10000 parts by mass of water. If the measurement is performed using a liquid prepared by adding water to the liquid mixture, a large amount of heat is generated, which may reduce the concentration of heptavalent manganese during the measurement. In addition, if the measurement is performed using the liquid mixture not diluted with water, handling difficulty may occur and the oxidation reaction may proceed before completion of filtering, which may reduce the concentration of heptavalent manganese. Further, when the amount of the water is less than 10 parts by mass per 1 part by mass of the liquid mixture, the equalization reaction may be promoted by a low-valence manganese, such as divalent manganese or trivalent manganese, which is eluted from the graphite oxide obtained by the oxidation reaction. Thereby, the concentration of heptavalent manganese may be reduced. When the amount of the water is more than 10000 parts by mass per 1 part by mass of the liquid mixture, it is difficult to accurately measure the absorbance.

In the method of measuring the concentration of heptavalent manganese in the present invention, it is preferred that 1 part by mass of the liquid mixture containing heptavalent manganese is added to 10 to 10000 parts by mass of water and then a liquid mixture resulting from the addition of the liquid mixture is stirred, for example, using a known stirrer.

Further, in the method of measuring the concentration of heptavalent manganese in the present invention, it is preferred that the liquid mixture resulting from the addition of the liquid mixture is stirred, the mixture is then filtered, and the absorbance of the resulting filtrate is measured. The filtration is preferably performed using a filter.

(Other Steps)

The method for producing graphite oxide of the present invention may include other step(s) such as an aging step of aging the reaction liquid obtained in the oxidation step, an oxidation termination (quenching) step, a stirring step for more sufficiently reducing the oxidant in the liquid mixture obtained in the oxidation termination step, and a purification step.

(Aging Step)

In the aging step, the temperature at which the reaction liquid obtained in the oxidation step is aged and the time for aging the reaction liquid may be appropriately selected. The temperature of the reaction liquid is maintained preferably at 0° C. to 90° C., more preferably at 20° C. to 80° C.

The time for aging is preferably 0.1 to 24 hours, more preferably 0.5 to 5 hours.

(Oxidation Termination Step)

The method for producing graphite oxide of the present invention may optionally include an oxidation termination step. The oxidation termination step may be a conventional method, that is, a method including adding water to a liquid mixture obtained in a method of oxidizing graphite, then adding a hydrogen peroxide solution to reduce an oxidant, and then terminating the reaction. However, the method for producing graphite oxide of the present invention preferably includes, as an oxidation termination step, the step of adding the liquid mixture obtained in the oxidation step to water or a hydrogen peroxide solution.

When the step of adding the liquid mixture obtained in the oxidation step to water or a hydrogen peroxide solution is applied as an oxidation termination step, a significant temperature increase of the liquid due to heat of hydration (heat of dilution) can be prevented. As a result, the termination reaction can be more safely performed in a shorter time. Further, the reduction of the graphite oxide in a conventional method can be prevented during the addition of water or a hydrogen peroxide solution by preventing a significant temperature increase of the liquid. As a result, high-quality graphite oxide can be stably produced. Further, generation of oxygen gas due to the reduction of the graphite oxide in a conventional method can be prevented during the addition of a hydrogen peroxide solution by preventing a significant temperature increase of the liquid, which can prevent sudden rise of the liquid level due to vigorous bubble generation. Therefore, the time required to terminate the reaction can be shortened.

That is, the method for producing graphite oxide of the present invention including the step of adding the liquid mixture obtained in the oxidation step to water or a hydrogen peroxide solution enables highly efficient production of high-quality graphite oxide while ensuring excellent safety.

The method for producing graphite oxide including the step of adding the liquid mixture obtained in the oxidation step to water or a hydrogen peroxide solution (second aspect of the present invention) enables highly efficient production of high-quality graphite oxide (an object of the second aspect of the present invention). That is, the second aspect of the present invention relates to, for example, the method for producing graphite oxide by oxidizing graphite, the method including the steps of oxidizing graphite by adding a oxidant to a liquid mixture containing graphite and sulfuric acid and adding a liquid mixture obtained in the oxidation step to water or a hydrogen peroxide solution in an amount of 120% by mass or more for 100% by mass of the liquid mixture. The amount of the water or the hydrogen peroxide solution in the addition step is preferably 200% by mass or more. The oxidation step in the second aspect of the present invention is not limited, but in order to significantly enhance the safety in the oxidation step, the oxidation step for the first aspect of the present invention is preferably applied. That is, the second aspect of the present invention relates to a method for producing graphite oxide by oxidizing graphite, the method including the step of oxidizing graphite by adding a permanganate to a liquid mixture containing graphite and sulfuric acid while maintaining the concentration of heptavalent manganese at 1% by mass or less in 100% by mass of the liquid mixture, and the step of adding a liquid mixture obtained in the oxidation step to water or a hydrogen peroxide solution in an amount of 120% by mass or more for 100% by mass of the liquid mixture. Preferred embodiments of the first aspect of the present invention may be applied to the second aspect of the present invention.

Hereinafter, when the oxidation termination step is adding the liquid mixture obtained in the oxidation step to water or a hydrogen peroxide solution, it is also referred to as an addition step. In this description of the addition step, the liquid mixture refers to the liquid mixture obtained in the oxidation step, unless otherwise noted. Although the following describes the embodiment of the first aspect of the present invention, the embodiment can also be applied to the second to fourth aspects of the present invention as much as possible unless otherwise noted.

As described above, when the oxidation reaction is terminated by adding the liquid mixture obtained in the oxidation step to water or a hydrogen peroxide solution in an excessive amount relative to the liquid mixture, heat generation and bubble formation can be sufficiently prevented. In this case, a waiting time after stopping the addition can be reduced so that the time required to terminate the reaction can be shortened. Further, the reduction reaction of graphite oxide can be prevented, and the reaction can be stably terminated, for example, by sufficiently preventing sudden rise of the liquid level. As a result, high-quality graphite oxide can be efficiently produced.

Further, in the addition step, coarse graphene oxide in the liquid mixture obtained in the oxidation step tends to aggregate and precipitate after it is added to water or a hydrogen peroxide solution. Therefore, the addition step probably enhances the efficiency of purification performed by solid-liquid separation such as decantation.

In order to more sufficiently prevent heat generation and bubble formation, the amount of the water or the hydrogen peroxide solution in the addition step for 100% by mass of the liquid mixture obtained in the oxidation step is preferably 120% by mass or more, more preferably 200% by mass or more, still more preferably 300% by mass or more, further preferably 400% by mass or more, particularly preferably 500% by mass or more. The upper limit of the amount of the water or the hydrogen peroxide solution is not limited. In order to reduce the amount of wastewater, the amount of the water or the hydrogen peroxide solution is preferably 2000% by mass or less, more preferably 1600% by mass or less, still more preferably 1200% by mass or less, particularly preferably 1000% by mass or less.

In another preferred embodiment of the method for producing graphite oxide of the present invention, in order to prevent bubble generation, the concentration of the hydrogen peroxide solution used in the addition step is 10% by mass or less. The concentration is more preferably 5% by mass or less, still more preferably 2% by mass or less, particularly preferably 1.5% by mass or less. In order to sufficiently reduce the oxidant, the concentration is preferably 0.01% by mass or more, more preferably 0.05% by mass or more, still more preferably 0.1% by mass or more, particularly preferably 0.2% by mass or more.

In another preferred embodiment of the method for producing graphite oxide of the present invention, the addition step is a step of adding the liquid mixture obtained in the oxidation step to water or a hydrogen peroxide solution whose temperature is maintained at 60° C. or lower. Thus, the addition step can be more safely performed, and high-quality graphite oxide can be produced particularly when a permanganate is used as an oxidant. Further, in the addition step, the liquid mixture obtained in the oxidation step is added to an excessive amount of water or a hydrogen peroxide solution. Thus, the temperature of the water or the hydrogen peroxide solution can be easily maintained at 60° C. or lower. As a result, graphite oxide can be efficiently produced.

In the addition step, the temperature of the water or the hydrogen peroxide solution is maintained more preferably at 55° C. or lower, still more preferably at 50° C. or lower.

In another preferred embodiment of the method for producing graphite oxide of the present invention, in the addition step, the liquid mixture obtained in the oxidation step is added to water or a hydrogen peroxide solution while the temperature variation is maintained within 40° C. Thus, the addition step can be more safely performed, and high-quality graphite oxide can be produced particularly when a permanganate is used as an oxidant. Further, in the addition step, the liquid mixture obtained in the oxidation step is added to an excessive amount of water or a hydrogen peroxide solution. Thus, the temperature variation of the water or the hydrogen peroxide solution can be easily maintained within 40° C. As a result, graphite oxide can be efficiently produced.

The temperature variation refers to a difference between the temperature of the water or the hydrogen peroxide solution before addition of the liquid mixture and the maximum value of the temperature of the water or the hydrogen peroxide solution increased by addition of the liquid mixture.

The temperature variation is maintained more preferably within 35° C., still more preferably within 30° C.

In another preferred embodiment of the method for producing graphite oxide of the present invention, the liquid mixture may be added to water or hydrogen peroxide solution having a temperature of 5° C. to 25° C.

In the addition step, the liquid mixture obtained in the oxidation step may be added to water or a hydrogen peroxide solution at once, gradually, or in multiple portions. In order to sufficiently prevent heat generation and bubble formation, the liquid mixture obtained in the oxidation step is preferably added to water or a hydrogen peroxide solution gradually or in multiple portions, whereas in order to simplify the operation, the liquid mixture is preferably added at once.

In order to sufficiently prevent heat generation and bubble formation to more sufficiently achieve the effects of the present invention, the multiple portions are preferably three or more portions, more preferably five or more portions. In order to simplify the operation, the liquid mixture is added preferably in fifty or less portions, more preferably in thirty or less portions.

When the liquid mixture obtained in the oxidation step is added in multiple portions to water or a hydrogen peroxide solution in the addition step, the amounts of the respective portions may be the same as or different from each other.

When the liquid mixture obtained in the oxidation step is added in three or more portions in the oxidation step, the time intervals between additions may be the same as or different from each other.

In another preferred embodiment of the method for producing graphite oxide of the present invention, in the addition step, the liquid mixture obtained in the oxidation step is added to water or a hydrogen peroxide solution at an addition rate of 0.5% by mass/min or higher relative to 100% by mass of the water or the hydrogen peroxide solution. Thus, high-quality graphite oxide can be efficiently produced to more significantly achieve the effects of the present invention. The addition rate is more preferably 1% by mass/min or higher, still more preferably 2% by mass/min or higher. The addition rate is preferably 100% by mass/min or lower, more preferably 50% by mass/min or lower, still more preferably 20% by mass/min or lower.

The amount of the water or the hydrogen peroxide solution refers to the amount of the water or the hydrogen peroxide solution before the liquid mixture is added thereto.

In the addition step, the time from the start to the end of the addition is not limited. In another preferred embodiment of the method for producing graphite oxide of the present invention, the liquid mixture obtained in the oxidation step is added to water or a hydrogen peroxide solution over 0.1 minutes or more and 180 minutes or less.

In order to further shorten the time required to terminate the reaction, the liquid mixture obtained in the oxidation step is added more preferably over 120 minutes or less, still more preferably over 60 minutes or less, particularly preferably over 30 minutes or less, in the addition step. In addition, in order to produce higher-quality graphite oxide, the liquid mixture obtained in the oxidation step is added more preferably over 0.5 minutes or more, still more preferably over 1 minute or more, in the addition step.

In another preferred embodiment of the method for producing graphite oxide of the present invention, the addition step is a step of adding the liquid mixture obtained in the oxidation step to a hydrogen peroxide solution.

In conventional reaction termination methods, in order to prevent heat generation and bubble formation, the reaction is terminated by reducing and deactivating an oxidant in a liquid mixture not by first adding a hydrogen peroxide solution to the liquid mixture obtained in an oxidation step, but by first adding water and then adding a hydrogen peroxide solution to a liquid mixture.

On the other hand, heat generation and bubble formation can be sufficiently prevented in the method for producing graphite oxide of the present invention, and the oxidant in the liquid mixture can be reduced and deactivated by adding the liquid mixture obtained in the oxidation step to a hydrogen peroxide solution in a very excessive amount relative to the liquid mixture. Therefore, graphite oxide with stable quality can be produced with remarkable efficiency.

When the addition step in the method for producing graphite oxide of the present invention is a step of adding the liquid mixture obtained in the oxidation step to water, a hydrogen peroxide solution is usually further added to the liquid mixture obtained in the addition step to reduce and deactivate an oxidant such as a permanganate.

In another preferred embodiment of the method for producing graphite oxide of the present invention, the addition step is performed while water or a hydrogen peroxide solution to which the liquid mixture obtained in the oxidation step is to be added is stirred. The stirring may be performed, for example, using a known stirrer.

The addition step may be performed in the air or in an inert gas atmosphere, such as in a nitrogen, helium, or argon atmosphere. The step may be performed also in a vacuum.

The pressure conditions are not limited in the addition step, and the addition step is preferably performed under, for example, atmospheric pressure.

The addition step is specifically described above as the oxidation termination step. In addition to this, the oxidation termination step may be performed by adding water to the liquid mixture having a temperature of, for example, 5° C. to 15° C., followed by addition of a hydrogen peroxide solution as a reducing agent. The oxidation termination step may be performed, for example, in the air, in an inert gas atmosphere, such as in a nitrogen, helium, or argon atmosphere, or in a vacuum, like the addition step.

The time of the oxidation termination step may be, for example, 0.01 to 5 hours.

(Stirring Step)

After the oxidation termination step (e.g. addition step) and before a purification step, a stirring step is preferably performed to stir the liquid mixture obtained in the oxidation termination step so that the oxidant in the liquid mixture obtained in the oxidation termination step is more sufficiently reduced.

In the stirring step, the liquid mixture obtained in the addition step is stirred preferably for 1 minute or more, more preferably for 3 minutes or more, still more preferably for 5 minutes or more. In addition, the liquid mixture is stirred preferably for 2 hours or less, more preferably for 1.5 hours or less, still more preferably for 1 hour or less.

In the stirring step, the temperature of the liquid mixture obtained in the oxidation termination step may be, for example, 20° C. to 60° C.

(Purification Step)

The method for producing graphite oxide of the present invention may optionally include a purification step. A conventional method, that is, a method of separating and purifying graphite oxide by centrifuging or filtering a reaction liquid containing graphite oxide may be applied to the purification step. However, the method for producing graphite oxide of the present invention preferably includes as a purification step the step of allowing a graphite oxide-containing liquid to stand at 30° C. to 90° C. and then separating a supernatant liquid.

When the step of allowing a graphite oxide-containing liquid to stand at 30° C. to 90° C. and then separating a supernatant liquid is applied as a purification step, no extensive equipment is needed even in the industrial production, and separation between a supernatant liquid and a precipitate (solids) phase proceeds in a relatively short time. As a result, the purification step can be more safely performed in a shorter time.

That is, the method for producing graphite oxide of the present invention includes the step of allowing a graphite oxide-containing liquid to stand at 30° C. to 90° C. and then separating a supernatant liquid (hereinafter, also referred to as "supernatant liquid separation step"), and therefore enables more highly efficient production of graphite oxide while more excellent safety is ensured.

The method for producing graphite oxide including the step of allowing a graphite oxide-containing liquid to stand at 30° C. to 90° C. and then separating a supernatant liquid (the third aspect of the present invention) enables more highly efficient production of graphite oxide (an object of the third aspect of the present invention). That is, the third aspect of the present invention relates to, for example, a method for producing graphite oxide by oxidizing graphite, the method including the steps of oxidizing graphite and purifying graphite oxide obtained in the oxidation step, the purification step including the step of allowing a graphite oxide-containing liquid to stand at 30° C. to 90° C. and then separating a supernatant liquid. The oxidation step in the third aspect of the present invention is not limited. In order to significantly enhance the safety, the oxidation step for the first aspect of the present invention is preferably used. That is, the third aspect of the present invention preferably relates to a method for producing graphite oxide by oxidizing graphite, the method including oxidizing graphite by adding a permanganate to a liquid mixture containing graphite and sulfuric acid while maintaining the concentration of heptavalent manganese at 1% by mass or less in 100% by mass of the liquid mixture and purifying graphite oxide obtained in the oxidation step, the purification step including the step of allowing a graphite oxide-containing liquid to stand at 30° C. to 90° C. and then separating a supernatant liquid.

Preferred embodiments of the first aspect of the present invention may be applied to the third aspect of the present invention. For example, the addition step may be used as the oxidation termination step in the third aspect of the present invention.

Graphite in the form of fine particles is usually used to produce graphite oxide, and in this case, fine-grain graphite oxide is obtained. Generally, since the molecular motion of a particulate matter is activated when they are heated, the precipitation speed of a particulate matter in a solution is assumed to be reduced with an increase in the temperature of the solution. However, in the present invention, the reaction liquid containing graphite oxide is found to show the opposite trend that the precipitation speed increases as the temperature is increased to a temperature higher than room temperature. The reason for this is not clear, but it is presumed as follows: ionization of components such as sulfuric acid contained in the reaction liquid proceeds as the temperature of the reaction liquid containing graphite oxide increases, leading to an increase in hydrogen ions in the reaction liquid; the increased hydrogen ions in the reaction liquid prevent ionization of the hydroxy groups of graphite oxide, leading to an increase in the proportion of hydroxy groups in its original form; and as a result, graphite oxide particles are less likely to repel each other and are likely to aggregate.

In the supernatant liquid separation step, the graphite oxide-containing liquid has only to be allowed to stand at 30° C. to 90° C. In view of production efficiency and economic efficiency, the liquid is allowed to stand preferably at 35° C. to 85° C., more preferably at 40° C. to 80° C., still more preferably at 50° C. to 70° C.

In the supernatant liquid separation step, the longer the standing time of the reaction liquid containing graphite oxide, the more the separation of the reaction liquid and graphite oxide proceeds. In view of the production efficiency of the graphite oxide, the graphite oxide-containing liquid is allowed to stand at 30° C. to 90° C. preferably for 0.1 to 24 hours, more preferably for 0.2 to 12 hours, still more preferably for 0.3 to 6 hours.

In another preferred embodiment of the method for producing graphite oxide of the present invention, the ratio between the mass of the graphite used in the oxidation step and the mass of the graphite oxide-containing liquid subjected to the purification step (mass of the graphite used in the oxidation step/mass of the graphite oxide-containing liquid subjected to the purification step) is 0.0001 to 0.05. At such a mass ratio between the graphite and the reaction liquid, the reaction liquid and the graphite oxide can be more sufficiently separated from each other without generating too much waste liquid. The mass ratio is more preferably 0.0005 to 0.03, still more preferably 0.001 to 0.02, particularly preferably 0.005 to 0.02, most preferably 0.005 to 0.017.

In the present invention, in order to achieve the aforementioned mass ratio, water may optionally be added to the reaction liquid containing graphite oxide after the oxidation step.

The supernatant liquid separation step may optionally include other step(s) as long as it includes the step of allowing a graphite oxide-containing liquid to stand at 30° C. to 90° C. and then separating a supernatant liquid. Preferably, the supernatant liquid separation step includes washing the separated graphite oxide with a washing solvent, and then separating the wash solution and the graphite oxide from each other. Such a washing step can lead to the production of higher purity graphite oxide.

The method for producing graphite oxide of the present invention may optionally include a washing step. In the washing step, any washing solvent may be used as long as graphite oxide is washed. One or two or more of water, methanol, ethanol, isopropanol, acetone, and the like may be used.

In the washing step, the graphite oxide may be separated from the wash solution by any method. It is preferred that the wash solution containing the graphite oxide is allowed to stand at 30° C. to 90° C. and then a supernatant liquid is separated as in the case of separating the graphite oxide from the reaction liquid. In this case, the graphite oxide can be efficiently separated from the wash solution. The preferred range of the temperature at which the wash solution is allowed to stand is the same as the preferred range of the temperature at which the above-described reaction liquid containing graphite oxide is allowed to stand.

Further, the preferred range of the time for allowing the wash solution to stand is the same as the preferred range of the time for allowing the above-described reaction liquid containing graphite oxide to stand.

The graphite oxide may be further reduced to eliminate a hydrophilic functional group, and thereby may be formed into highly hydrophobic reduced graphite oxide. The same steps as the oxidation step and the purification step in the above-described method for producing graphite oxide of the present invention can be applied to such production of the reduced graphite oxide. Reduced graphite oxide can be efficiently produced using such steps.

The method for producing reduced graphite oxide, that is, a method for producing reduced graphite oxide by reducing graphite oxide is another aspect of the present invention in which the method includes the steps of oxidizing graphite, purifying graphite oxide obtained in the oxidation step, and reducing graphite oxide obtained in the purification step, the purification step including the step of allowing a graphite oxide-containing liquid to stand at 30° C. to 90° C. and then separating a supernatant liquid. In particular, the method of producing a reduced graphite oxide by reducing graphite oxide is one of the preferred embodiments of the present invention in which the method includes the steps of oxidizing graphite by adding a permanganate to a liquid mixture containing graphite and sulfuric acid while maintaining the concentration of heptavalent manganese at 1% by mass or less in 100% by mass of the liquid mixture, purifying graphite oxide obtained in the oxidation step, and reducing graphite oxide obtained in the purification step, the purification step including the step of allowing a graphite oxide-containing liquid to stand at 30° C. to 90° C. and then separating a supernatant liquid.

In the method for producing reduced graphite oxide of the present invention, the graphite oxide may be reduced by any method as long as it is reduced by elimination of hydrophilic functional groups therefrom. For example, a known reducing agent such as $NaBH_4$, $LiAlH_4$, or L-ascorbic acid may be used or electrolytic reduction may be performed. Preferably, the graphite oxide is reduced by heating.

The graphite oxide is heated preferably at 100° C. or higher, more preferably at 120° C. or higher. The upper limit of the heating temperature of the graphite oxide is not limited. The graphite oxide is usually heated at 2000° C. or lower.

The graphite oxide is heated preferably for 0.1 to 100 hours, more preferably for 0.2 to 50 hours.

The graphite oxide may be heated in the air or in an inert gas atmosphere, such as in a nitrogen, helium, or argon atmosphere. The graphite oxide may be heated also in a vacuum.

The preferred embodiments of the step of oxidizing graphite and the step of purifying graphite oxide obtained in the oxidation step in the method for producing reduced graphite oxide of the present invention are the same as the preferred embodiments of the steps in the above-described method for producing graphite oxide of the present invention.

The method for producing reduced graphite oxide of the present invention may optionally include other step(s) as long as the method includes the steps of oxidizing graphite, purifying graphite oxide obtained in the oxidation step, and reducing graphite oxide obtained in the purification step. Examples of other step(s) include the above-described oxidation termination step.

The method for producing graphite oxide of the present invention may optionally include the step of recovering the sulfuric acid used in the oxidation reaction of graphite (hereinafter, also referred to as a recovering step). The step of oxidation reaction of graphite is also referred to as a first oxidation step. The recovering step is not limited. When the sulfuric acid used in the oxidation reaction of graphite is recovered, the method for producing graphite oxide of the present invention preferably includes, in addition to the step of recovering the sulfuric acid used in the oxidation reaction of graphite (hereinafter, also referred to as a recovering step), the step of mixing the recovered sulfuric acid with graphite (hereinafter, also referred to as a mixing step), and the step of oxidizing the graphite by adding an oxidant to a liquid mixture obtained in the mixing step (hereinafter, also referred to as a second oxidation step).

The production method including the recovering step, mixing step, and oxidation step enables the efficient production of high-quality graphite oxide while the safety is ensured and the resource and energy savings are enhanced. That is, even though the recovered sulfuric acid may contain a trace of oxidant, the mixing step enables safe handling of the recovered sulfuric acid and elimination or reduction of the step of treating a large amount of sulfuric acid. As a result, high-quality graphite oxide is efficiently produced.

The method for producing graphite oxide including the steps of oxidizing graphite, recovering the sulfuric acid used in the oxidation reaction of graphite, mixing the recovered sulfuric acid with graphite, and oxidizing graphite by adding an oxidant to a liquid mixture obtained in the mixing step (the fourth aspect of the present invention) enables efficient production of high-quality graphite oxide (an object of the fourth aspect of the present invention) with excellent resource and energy savings. That is, the fourth aspect of the present invention relates to, for example, a method for producing graphite oxide by oxidizing graphite, the method including the steps of recovering the sulfuric acid used in the oxidation reaction of graphite, mixing the recovered sulfuric acid with graphite, and oxidizing graphite by adding an oxidant to a liquid mixture obtained in the mixing step. The oxidation step according to the fourth aspect of the present invention is not limited. In order to significantly enhance the safety, embodiments similar to those of the oxidation step for the first aspect of the present invention are preferably used. That is, preferably, the fourth aspect of the present invention relates to a method for producing graphite oxide by oxidizing graphite, the method including the steps of recovering the sulfuric acid used in the oxidation reaction of graphite, mixing the recovered sulfuric acid with graphite, and oxidizing graphite by adding an oxidant to a liquid mixture obtained in the mixing step, and the method satisfies one or both of the following (I) and (II): (I) the oxidation reaction of graphite is a reaction of oxidizing graphite by adding a permanganate to the liquid mixture containing graphite and sulfuric acid while maintaining the concentration of heptavalent manganese at 1% by mass or less in 100% by mass of the liquid mixture; and (II) the step of oxidizing graphite is a step of oxidizing graphite by adding a permanganate to the liquid mixture while maintaining the concentration of heptavalent manganese at 1% by mass or less in 100% by mass of the liquid mixture. The preferred embodiments of the first aspect of the present invention may be applied to the fourth aspect of the present invention. For example, one or both of the addition step and the supernatant liquid separation step may be applied to the fourth aspect of the present invention as the oxidation termination step. Further, the sulfuric acid used in the oxidation reaction of graphite is preferably the same as the sulfuric acid used in the production method of the present invention.

The following describes the three steps in the order of the recovering step, mixing step, and oxidation step. Although the following describes the three steps in one embodiment of the first aspect of the present invention, these three steps can also be applied to the three steps of the fourth aspect of the present invention unless otherwise noted or conflict arises.

In an embodiment of the method for producing graphite oxide of the present invention including the three steps, a series of the three steps may be performed once or may be performed twice or more after recovering the sulfuric acid obtained in the oxidation step, i.e. the last step of the series.

The method for producing graphite oxide by oxidizing graphite may further include after the oxidation step, other step(s) such as a reaction termination (quenching) step or a graphite oxide purification step. The other step(s) will be briefly described below after the three steps.

(Recovering Step)

In another preferred embodiment of the method for producing graphite oxide of the present invention, the method includes the step of recovering the sulfuric acid used in the oxidation reaction of graphite.

The oxidation reaction of graphite is not limited, but is preferably the same as the reaction in the oxidation step. Usually, an oxidant is used to oxidize graphite in the reaction, and the oxidant may be the above-described oxidant, preferably a permanganate. The step including the oxidation reaction of graphite before the step of recovering the sulfuric acid is referred to as a first oxidation step.

The recovering step may be recovering sulfuric acid from the liquid mixture obtained in the oxidation reaction of graphite or may be recovering sulfuric acid from a liquid mixture obtained by mixing the liquid mixture obtained in the oxidation reaction of graphite with water or a hydrogen peroxide solution in an amount very excessive relative to the liquid mixture and terminating the reaction. In order to recover sulfuric acid containing a smaller amount of impurities, sulfuric acid is preferably recovered from the liquid mixture obtained by the oxidation reaction of graphite before the oxidation termination step. Before the oxidation termination step, many of components derived from an oxidant (e.g. manganese ion) are maintained in the solids (between graphite oxide layers). By removing such solids, sulfuric acid containing a very small amount of impurities can be recovered. The amount of water in the sulfuric acid is also sufficiently small.

The recovering method in the recovering step is not limited. In order to easily recover sulfuric acid containing a small amount of impurities, solid-liquid separation is preferred. Examples of solid-liquid separation include centrifugation, filtering, and decantation, and each of these may be used alone or appropriate combination of two or more of these may be used. When graphite oxide is purified by solid-liquid separation, sulfuric acid may be recovered as a supernatant liquid. In order to further reduce the concentration of the components derived from the oxidant in the sulfuric acid used in the below-described mixing step, the sulfuric acid recovered may be further purified or may be mixed with additional sulfuric acid, as needed.

In another preferred embodiment of the method for producing graphite oxide of the present invention, the sulfuric acid used in the following mixing step has a manganese concentration of 10000 ppm or less. The oxidation reaction is sufficiently carried out oxidizing graphite using such sulfuric acid, and high-purity, high-quality graphite oxide tends to be easily provided. The manganese concentration refers to the manganese concentration in the sulfuric acid used in the mixing step. When the sulfuric acid recovered is mixed with additional sulfuric acid, the manganese concentration refers to the manganese concentration in the sulfuric acid after mixing. The manganese concentration is more preferably 3000 ppm or less, still more preferably 1000 ppm or less, further preferably 500 ppm or less, further more preferably 100 ppm or less, still further more preferably 50 ppm or less, particularly preferably 10 ppm or less.

The manganese concentration may be determined by the method described in the following examples.

The temperature of the liquid mixture in the recovering step is not limited, and is preferably 0° C. to 50° C., more preferably 10° C. to 40° C., for example.

The recovering step may be performed, for example, in the air or in an inert gas atmosphere. Further, the pressure conditions are not limited in the recovering step as long as sulfuric acid is in liquid form, and the recovering step may be performed under reduced pressure, atmospheric pressure, or pressure, and is preferably performed under, for example, atmospheric pressure.

(Mixing Step)

In another preferred embodiment of the method for producing graphite oxide of the present invention, the method includes the step of mixing the recovered sulfuric acid with graphite.

The amount of the graphite in 100% by mass of the liquid mixture obtained by mixing the recovered sulfuric acid with graphite is preferably 0.1% by mass or more, more preferably 0.3% by mass or more, still more preferably 0.5% by mass or more, particularly preferably 1% by mass or more. The amount of the graphite is preferably 30% by mass or less, more preferably 20% by mass or less, still more preferably 15% by mass or less, particularly preferably 10% by mass or less.

In the mixing step, the graphite may be used alone, or two or more graphites different in, for example, average particle size, form, specific surface area, or properties may be used in combination.

The mixing step is preferably performed with stirring, for example, using a known stirrer.

The mixing step may be performed, for example, in the air or in an inert gas atmosphere. Further, the pressure conditions are not limited in the mixing step, and the mixing step may be performed under reduced pressure, atmospheric pressure, or pressure, and is preferably performed under, for example, atmospheric pressure.

When the water content of the sulfuric acid used to prepare the liquid mixture is small (for example, less than 5% by mass), graphite oxide with good quality (for example, with high degree of exfoliation) can be obtained. However, in terms of the process, preferred is sulfuric acid with a water content within the range of, for example, 5% by mass or more and 15% by mass or less prepared by, for example, adding some water to concentrated sulfuric acid. At a water content of 5% by mass or more, an increase in the viscosity (solidification) of the reaction slurry is sufficiently prevented in the oxidation reaction, and the amount of the graphite to be supplied to the liquid mixture can be sufficiently increased. At a water content of 15% by mass or less, oxidation or exfoliation of graphite can sufficiently proceeds. The water content is more preferably 10% by mass or less.

The liquid mixture can be obtained by mixing the recovered sulfuric acid, graphite, and optionally other component(s). For example, the liquid mixture may further contain sulfuric acid in addition to the recovered sulfuric acid, as needed. The mixing can be appropriately performed by a known method. For example, the graphite is preferably homogeneously dispersed by ultrasonication or using a known disperser.

(Oxidation Step)

In another preferred embodiment of the method for producing graphite oxide of the present invention, the method includes the step of oxidizing graphite by adding an oxidant to a liquid mixture obtained in the mixing step. The oxidation step using the recovered sulfuric acid is also referred to as a second oxidation step.

The oxidation reaction is not limited, and the preferred embodiments of the oxidation step are as described above. For example, when a permanganate is used as an oxidant, graphite is preferably oxidized by adding a permanganate to the liquid mixture while maintaining the concentration of heptavalent manganese at 1% by mass or less in 100% by mass of the liquid mixture. The type of the oxidant used in the oxidation step, the amount thereof, the way of addition, the temperature of the liquid mixture in the oxidation step, the mass ratio of sulfuric acid to graphite (sulfuric acid/graphite), the stirring method, the pressure conditions, and the oxidation time in the oxidation step are the same as those mentioned above for the oxidation step. Both of the first oxidation step and the second oxidation step are particularly preferably steps of oxidizing graphite by adding a permanganate to a liquid mixture containing graphite and sulfuric acid while maintaining the concentration of heptavalent manganese at 1% by mass or less in 100% by mass of the liquid mixture.

(Other Steps)

The method for producing graphite oxide of the present invention may include other step(s) such as an aging step of aging the reaction liquid obtained in the oxidation step, an oxidation termination (quenching) step (for example, addition step), a stirring step for more sufficiently reducing the oxidant in the liquid mixture obtained in the oxidation termination step, and a purification step. These steps are the same as those mentioned above.

The method for producing graphite oxide of the present invention preferably includes, for example, the step of adding a liquid mixture obtained in the oxidation step to water or a hydrogen peroxide solution in an amount of 120% by mass or more, more preferably 200% by mass or more for 100% by mass of the liquid mixture. Further, in the method for producing graphite oxide of the present invention, a liquid mixture obtained in the addition step may be stirred so that an oxidant therein is more sufficiently reduced, for example.

The method for producing graphite oxide of the present invention may include other step(s) depending on the desired applications.

(Method for Storing Sulfuric Acid)

The present invention also relates to a method for storing sulfuric acid recovered after use in a method for producing graphite oxide by oxidizing graphite, and the method is a step of storing the recovered sulfuric acid with graphite added thereto. In particular, it is one of the preferred embodiments of the present invention that the method is a method for storing sulfuric acid recovered after use in a method for producing graphite oxide by oxidizing graphite by adding a permanganate to a liquid mixture containing graphite and sulfuric acid while maintaining the concentration of heptavalent manganese at 1% by mass or less in 100% by mass of the liquid mixture, and the storing method includes the steps of adding graphite to the recovered sulfuric acid and storing them. The recovered sulfuric acid, particularly, the sulfuric acid recovered before the oxidation termination step possibly contains a trace of explosive heptavalent manganese. Still such recovered sulfuric acid can be stably stored by adding graphite thereto.

In the method for storing sulfuric acid of the present invention, the storing step is preferably a step of maintaining the temperature of a liquid prepared by adding graphite to the recovered sulfuric acid at 20° C. or lower. According to this, the recovered sulfuric acid can be more stably stored.

The storing step is more preferably a step of maintaining the temperature of the sulfuric acid with graphite added thereto at 15° C. or lower, still more preferably at 10° C. or lower.

The manganese concentration in the recovered sulfuric acid is preferably 10000 ppm or less. In this case, sulfuric acid can be more stably stored.

The manganese concentration is more preferably 3000 ppm or less, still more preferably 1000 ppm or less, further preferably 500 ppm or less, further more preferably 100 ppm or less, still further more preferably 50 ppm or less, particularly preferably 10 ppm or less.

The manganese concentration may be determined by the method described in the following examples.

The amount of the graphite in 100% by mass of the liquid mixture obtained by adding graphite to the recovered sulfuric acid is preferably 0.1% by mass or more, more preferably 0.3% by mass or more, still more preferably 0.5% by mass or more, particularly preferably 1% by mass or more. The amount of the graphite is preferably 30% by mass or less, more preferably 20% by mass or less, still more preferably 15% by mass or less, particularly preferably 10% by mass or less.

In the storing step, the graphite may be used alone, or two or more graphites different in properties may be mixed and used. The graphite may be added at once or gradually added.

When the water content of the recovered sulfuric acid used in the storing step is small (for example, less than 5% by mass), graphite oxide with good quality (for example, with high degree of exfoliation) can be obtained by oxidizing graphite using such recovered sulfuric acid.

However, in terms of the process, the water content of the sulfuric acid is preferably, for example, 5% by mass or more and 15% by mass or less. At a water content of 5% by mass or more, solidification of the reaction slurry can be sufficiently prevented in the oxidation reaction, and the amount of the graphite to be supplied to the liquid mixture can be sufficiently increased. At a water content of 15% by mass or less, oxidation or exfoliation of graphite can sufficiently proceed during the oxidation of graphite. The water content is more preferably 10% by mass or less.

The storing step may be performed, for example, in the air or in an inert gas atmosphere. Further, the pressure conditions are not limited in the storing step as long as sulfuric acid is in liquid form, and the storing step may be performed under reduced pressure, atmospheric pressure, or pressure, preferably under, for example, atmospheric pressure.

The preferred properties of graphite used in the mixing step and the storing method of the present invention are the same as those of the graphite used to prepare the above liquid mixture.

The methods for producing graphite oxide of the first to fourth aspects of the present invention may include other step(s) such as a filtering step using a flocculant depending on the desired applications.

The graphite oxides obtained by the methods for producing graphite oxide of the first to fourth aspects of the present invention and the reduced graphite oxide obtained by the method for producing reduced graphite oxide of the present invention are excellent in, for example, the size of the specific surface area, easiness of chemical modification, and affinity with various solvents and polymer components, and are therefore suitable for catalysts (catalyst materials), electrode materials for cells and capacitors, thermoelectric conversion materials, conductive materials, light emitting materials, lubricant additives, additives for polymers, permeable membrane materials, oxidants, bactericidal agents, antimicrobial agents, water repellent materials, or adsorption materials. The graphite oxides and the reduced graphite oxide each have a specific surface area of preferably, for example, 10 $m^2/g$ or larger and 2700 $m^2/g$ or smaller.

It is one of the preferred embodiments that the graphite oxide has a sensitivity (grade) of 7 or low determined by the drop hammer test set forth in JIS K 4810. Such graphite oxide is presumed to contain highly active (unstable) oxygen in the structure. Therefore, the graphite oxide is expected to show higher effects when it is used particularly for, for example, oxidants, bactericidal agents, or antimicrobial agents. Graphite oxide with a sensitivity grade of 7 or low can be easily obtained by the production method of the present invention.

Examples of the cells include lithium ion secondary cells, polymer electrolyte fuel cells, and metal-air cells.

Examples of thermoelectric conversion apparatus using thermoelectric conversion materials include geothermal/hot spring geothermal generators, solar power generators, waste heat generators for, for example, factories or vehicles, generators such as body heat generators, and a variety of electric products, electric motors, and satellites equipped with the generator as at least one power source.

EXAMPLES

The present invention is described based on examples in more detail below. They are, however, by no means limitative of the scope of the invention. Unless otherwise mentioned, the term "part(s)" means "part(s) by mass" and "%" means "% by mass".

The following describes analyses and evaluations in examples and comparative examples.

<Method of Measuring Concentration of Heptavalent Manganese>

Multiple solutions with different known concentrations of heptavalent manganese were prepared. The absorbance of each solution was measured at 540 nm using a photoelectrometer (AP-1000M, produced by APEL), and a calibration curve was prepared by plotting the absorbances versus the concentrations of heptavalent manganese.

During the oxidation step of graphite, 1 part by mass of the liquid mixture was sampled and added to 10 to 10000 parts by mass of water, and they were homogeneously mixed by stirring and filtered using a filter with a pore size of 0.2 to 0.5 µm to obtain a filtrate received in a glass cell. The filtrate was subjected to absorbance measurement at 540 nm using the photoelectrometer, and the concentration of the heptavalent manganese in the liquid mixture was determined from the calibration curve.

<Method of Measuring Ratio of Peak Intensity of D Band to Peak Intensity of G Band in Raman Spectrum>

The ratio was measured by irradiating a sample with 532-nm laser using a microscope laser Raman spectrometer (NSR-3100, produced by JASCO Corporation).

<Method of Measuring Spacing>

XRD measurement was performed using a sample horizontal X-ray diffraction system (SmartLab, produced by Rigaku Corporation) to determine the X-ray diffraction peak derived from the (002) plane of graphite. The spacing was calculated from the peak position.

<XPS Measurement>

XPS measurement was performed using a photoelectron spectrometer (JPS-9000MX, produced by JEOL). Regarding the C1s narrow scan spectrum, background correction was performed by the Shirley method, and peak separation was performed by peak fitting with the Gaussian-Lorentzian function as a fitting function.

<XRF Measurement>

XRF measurement was performed using an X-ray fluorescence spectrometer (produced by Philips, PW2404) by the calibration curve method.

<Drop Hammer Test>

The drop hammer test set forth in JIS K 4810 was performed.

Example 1-1

Figure 2:
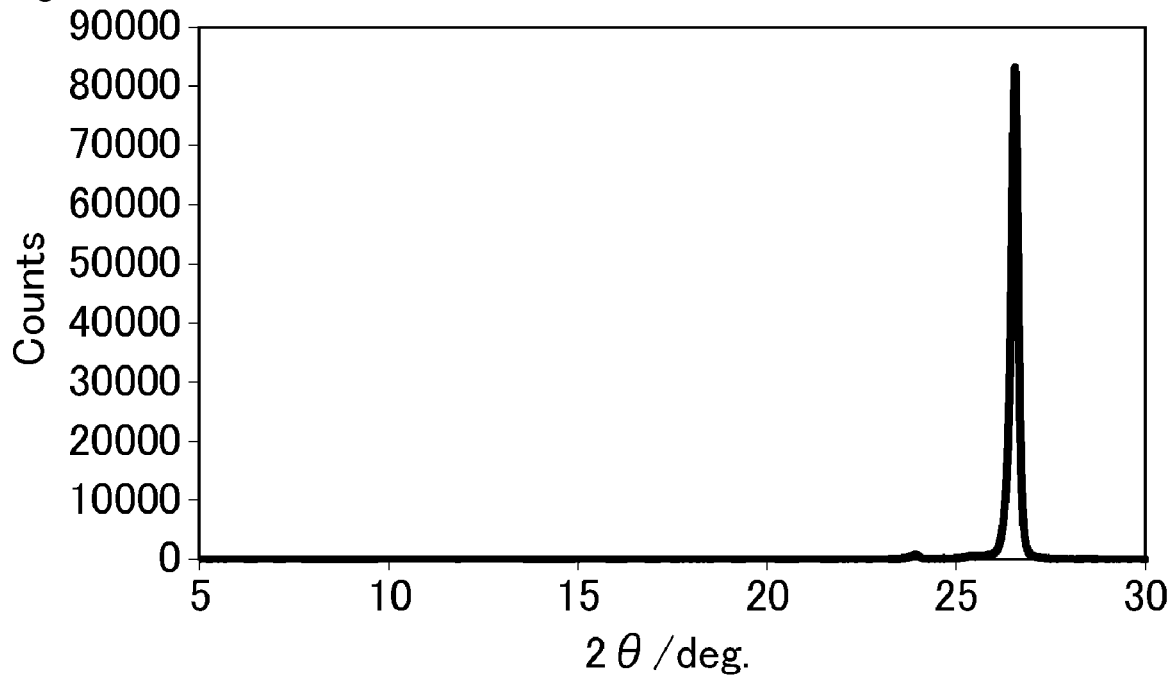
FIG. 2 is a graph showing the result of XRD measurement of natural graphite used as a raw material in Example 1-1.

A 1-L separable flask was charged with 869.40 g of concentrated sulfuric acid (special grade, produced by Wako Pure Chemical Industries, Ltd.) and 18.90 g of natural graphite (Z-100, flaky graphite, produced by Ito Graphite Co., Ltd.) to prepare a liquid mixture. The Raman spectrum and XRD pattern of the natural graphite (Z-100) are shown in FIGS. 1 and 2, respectively. FIG. 1 shows that the ratio of the peak intensity of the D band to the peak intensity of the G band in the Raman spectrum was 0.084, and FIG. 2 shows that the spacing of the (002) planes of graphite was 3.36 Å determined by X-ray diffraction. The natural graphite (Z-100) had an average particle size of 61.80 µm and a specific surface area of 4.65 m$^2$/g.

A given amount of potassium permanganate (special grade, produced by Wako Pure Chemical Industries, Ltd.) was added to the liquid mixture in the separable flask in 15 portions at 17-minute intervals while the liquid mixture was stirred. The amount of the potassium permanganate in each portion was 5.04 g, and the total amount of the potassium permanganate added was 75.60 g. For the second and later additions of the potassium permanganate, the concentration of the heptavalent manganese in the liquid mixture was quantified immediately before each addition by the above-described method of measuring the heptavalent manganese. Specifically, 0.3 g of the liquid mixture was sampled and added to and mixed with 100 g of water by stirring, and the resulting mixture was filtered to obtain a filtrate. Then, the absorbance of the filtrate was measured to quantify the concentration of heptavalent manganese. The result was that the concentration of heptavalent manganese was 0.65% by mass or less at all measurements. This showed that since the amount of the heptavalent manganese contained in each portion of the potassium permanganate (5.04 g) was 0.2% by mass or less for 100% by mass of the liquid mixture, the concentration of the heptavalent manganese in the liquid mixture was maintained at 0.85% by mass or less from the start to the end of the addition of the potassium permanganate. The temperature of the liquid mixture fell within the range of 24° C. to 30° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture was cooled to room temperature (20° C.), and 200 g of the liquid mixture was added to a beaker containing 1000 g of water having room temperature (20° C.) over 15 minutes. From the start to the end of the addition of the liquid mixture, water in the beaker was stirred all the time, and the temperature of the water (liquid temperature) was maintained at 45° C. or lower. Subsequently, 11.08 g of a 30% hydrogen peroxide solution (special grade, produced by Wako Pure Chemical Industries, Ltd.) was added over 1.5 minutes. Bubble generation was observed upon addition of the hydrogen peroxide solution, but sudden rise of the liquid level did not occur.

Figure 3:
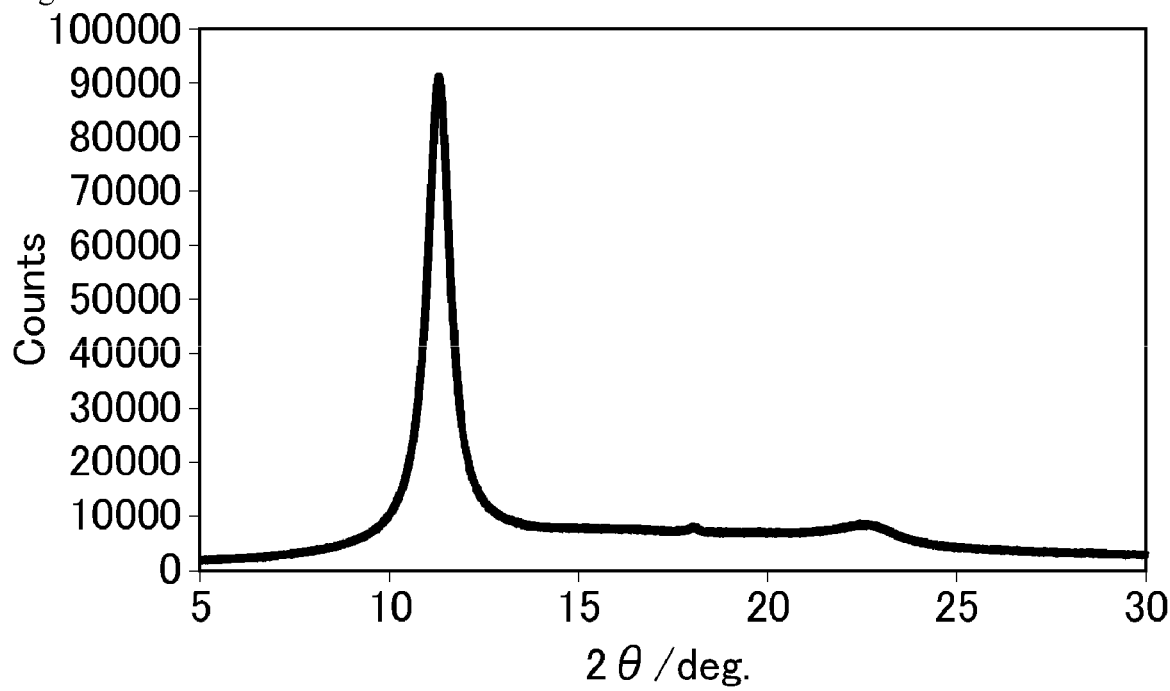
FIG. 3 is a graph showing the result of XRD measurement of the dried product obtained in Example 1-1.
Figure 4:
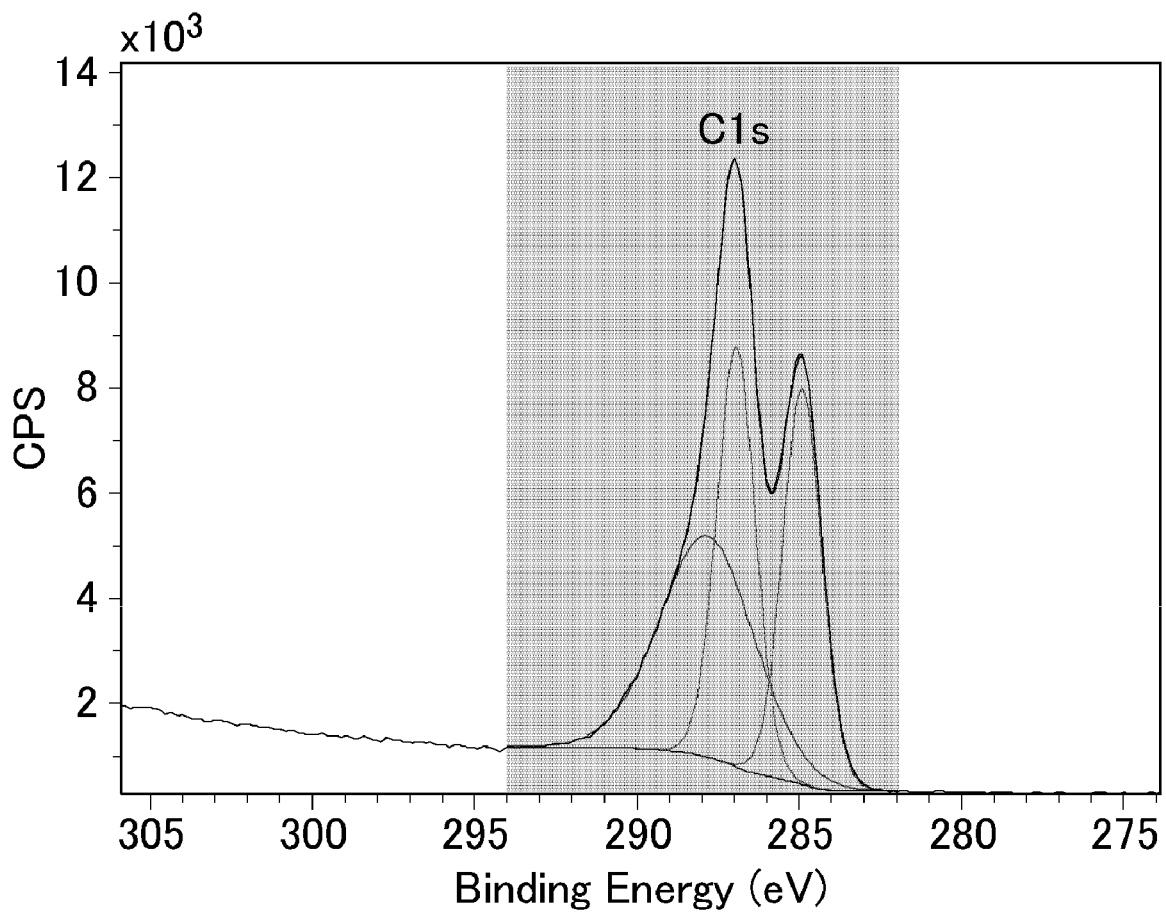
FIG. 4 is a graph showing the result of XPS measurement of the dried product obtained in Example 1-1.
Figure 5:
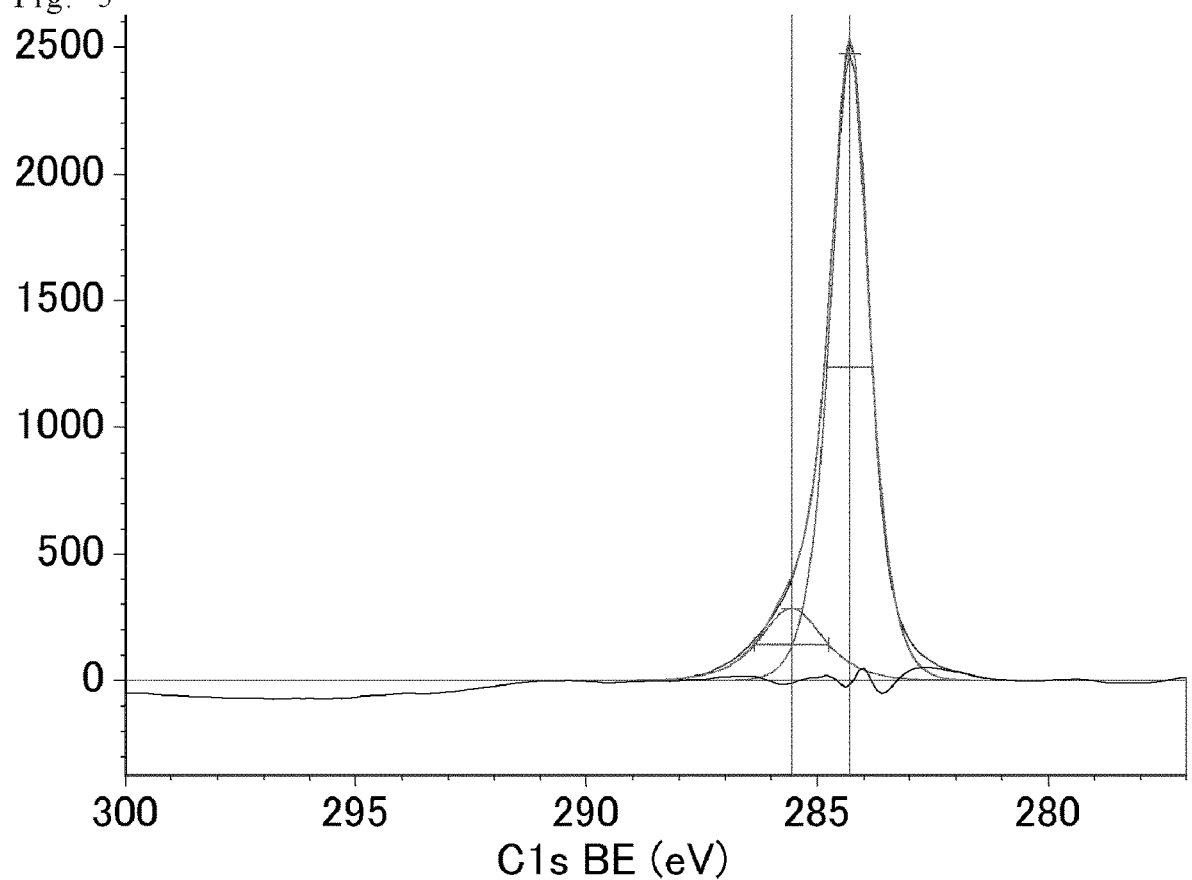
FIG. 5 is a graph showing the result of XPS measurement of natural graphite used as a raw material in Example 1-1.

Next, 200 g of the resulting liquid mixture in the beaker was diluted with 1000 g of water, and the dilution was filtered. The substance left on the filter paper was washed with 200 g of water and dried at 40° C. overnight under reduced pressure. The XRD pattern and the C1s spectrum (narrow scan spectrum) determined by XPS measurement of the resulting dried product are shown in FIGS. 3 and 4, respectively. The C1s spectrum (narrow scan spectrum) determined by XPS measurement of the natural graphite (Z-100) used as a raw material is shown in FIG. 5. FIG. 3 shows that no peak derived from the (002) plane of graphite is observed (in the vicinity of 2θ=26.5°), and a typical peak derived from graphite oxide (graphene oxide) is observed in the vicinity of 2θ=10° to 12°. In FIG. 5, most of the peaks were derived from a bond between carbon atoms (in the vicinity of 284 to 285 eV), whereas in FIG. 4, the proportion of the peaks derived from a C—O bond (in the vicinity of 286 to 287 eV) and the proportion of the peaks derived from a C=O bond (in the vicinity of 288 to 289 eV) are significantly high. As a result of these analyses, the resulting dried product was confirmed to be graphite oxide (graphene oxide).

Example 1-2

Figure 6:
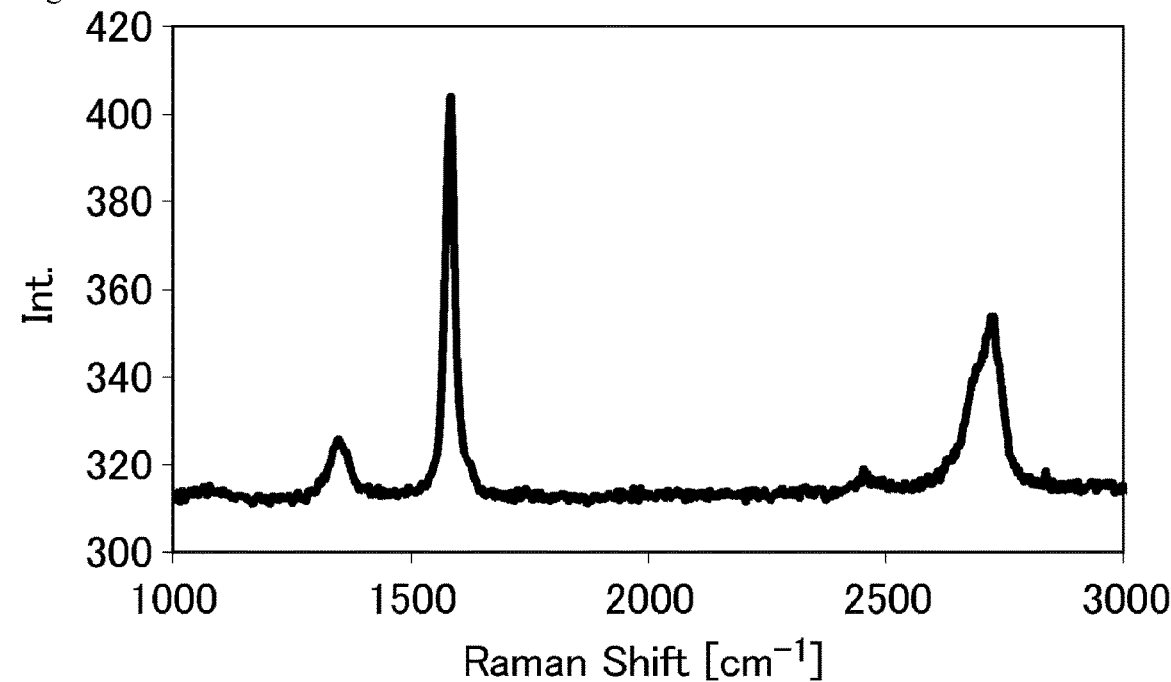
FIG. 6 is a graph of the Raman spectrum of natural graphite used as a raw material in Example 1-2.
Figure 7:
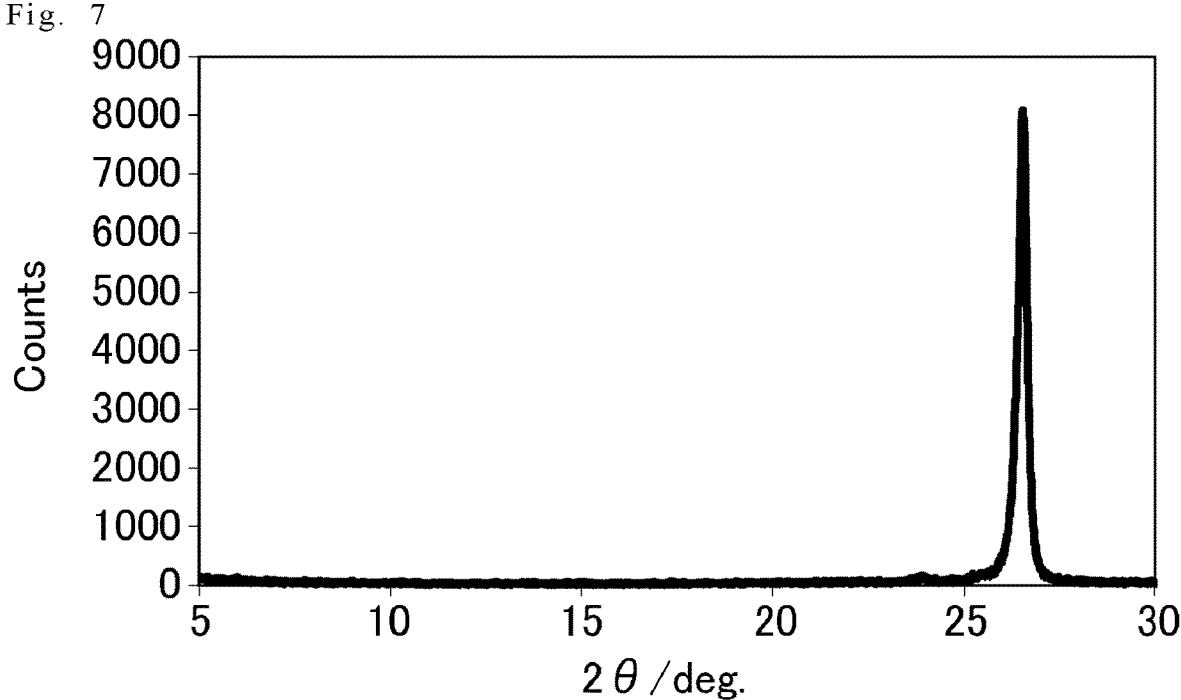
FIG. 7 is a graph showing the result of XRD measurement of natural graphite used as a raw material in Example 1-2.

A 20-L corrosion-resistant reactor was charged with 10021.85 g of concentrated sulfuric acid (special grade, produced by Wako Pure Chemical Industries, Ltd.) and 348.59 g of natural graphite (Z-5F, flaky graphite, produced by Ito Graphite Co., Ltd.) to prepare a liquid mixture. The Raman spectrum and XRD pattern of the natural graphite (Z-5F) are shown in FIGS. 6 and 7, respectively. FIG. 6 shows that the ratio of the peak intensity of the D band to the peak intensity of the G band in the Raman spectrum was 0.21, and FIG. 7 shows that the spacing of the (002) planes of graphite was 3.38 Å determined by X-ray diffraction. The natural graphite (Z-5F) had an average particle size of 3.38 µm and a specific surface area of 8.24 m$^2$/g.

A given amount of potassium permanganate (special grade, produced by Wako Pure Chemical Industries, Ltd.) was added to the liquid mixture in the corrosion-resistant reactor in 20 portions at 15-minute intervals while the liquid mixture was stirred. The amount of the potassium permanganate in each portion was 43.57 g, and the total amount of the potassium permanganate added was 871.40 g. For the second and later additions of the potassium permanganate, the concentration of the heptavalent manganese in the liquid mixture was quantified immediately before each addition by the above-described method of measuring the heptavalent manganese. Specifically, 3 g of the liquid mixture was sampled and added to and mixed with 100 g of water by stirring for 1 minute, and the resulting mixture was filtered to obtain a filtrate. Then, the absorbance of the filtrate was measured to quantify the concentration of heptavalent manganese. The result was that the concentration of heptavalent manganese was 0.04% by mass or less at all measurements. This showed that since the amount of the heptavalent manganese contained in each portion of the potassium permanganate (43.57 g) was 0.15% by mass or less for 100% by mass of the liquid mixture, the concentration of the heptavalent manganese in the liquid mixture was maintained at 0.19% by mass or less from the start to the end of the addition of the potassium permanganate. The temperature of the liquid mixture fell within the range of 18° C. to 28° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, 6 g of the liquid mixture was added to a beaker containing 100 g of water having room temperature (20° C.), and they were mixed by stirring for 1 minute.

Figure 8:
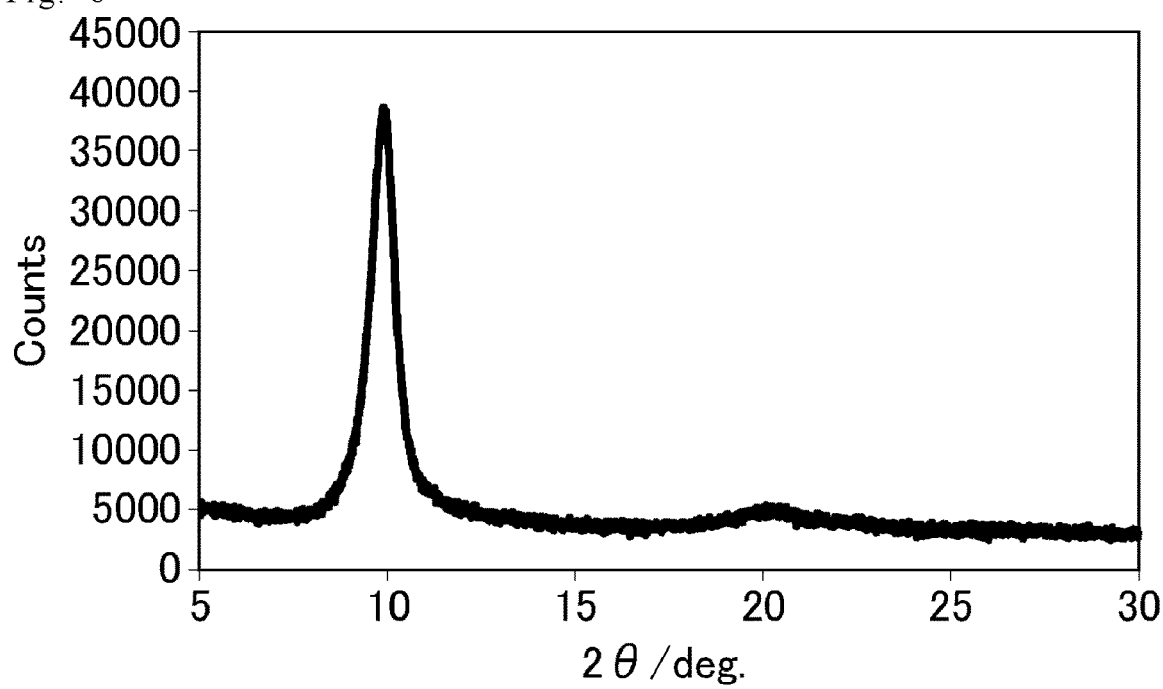
FIG. 8 is a graph showing the result of XRD measurement of the dried product obtained in Example 1-2.
Figure 9:
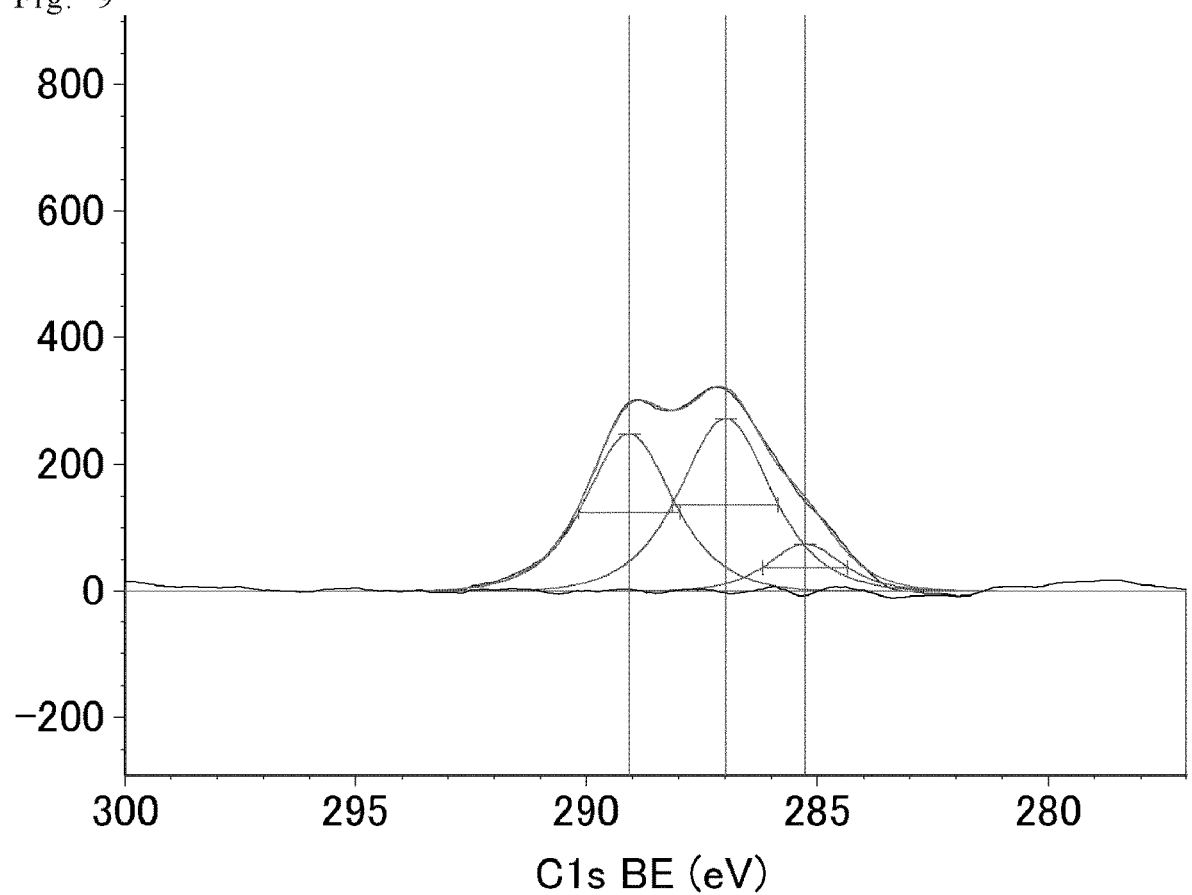
FIG. 9 is a graph showing the result of XPS measurement of the dried product obtained in Example 1-2.
Figure 10:
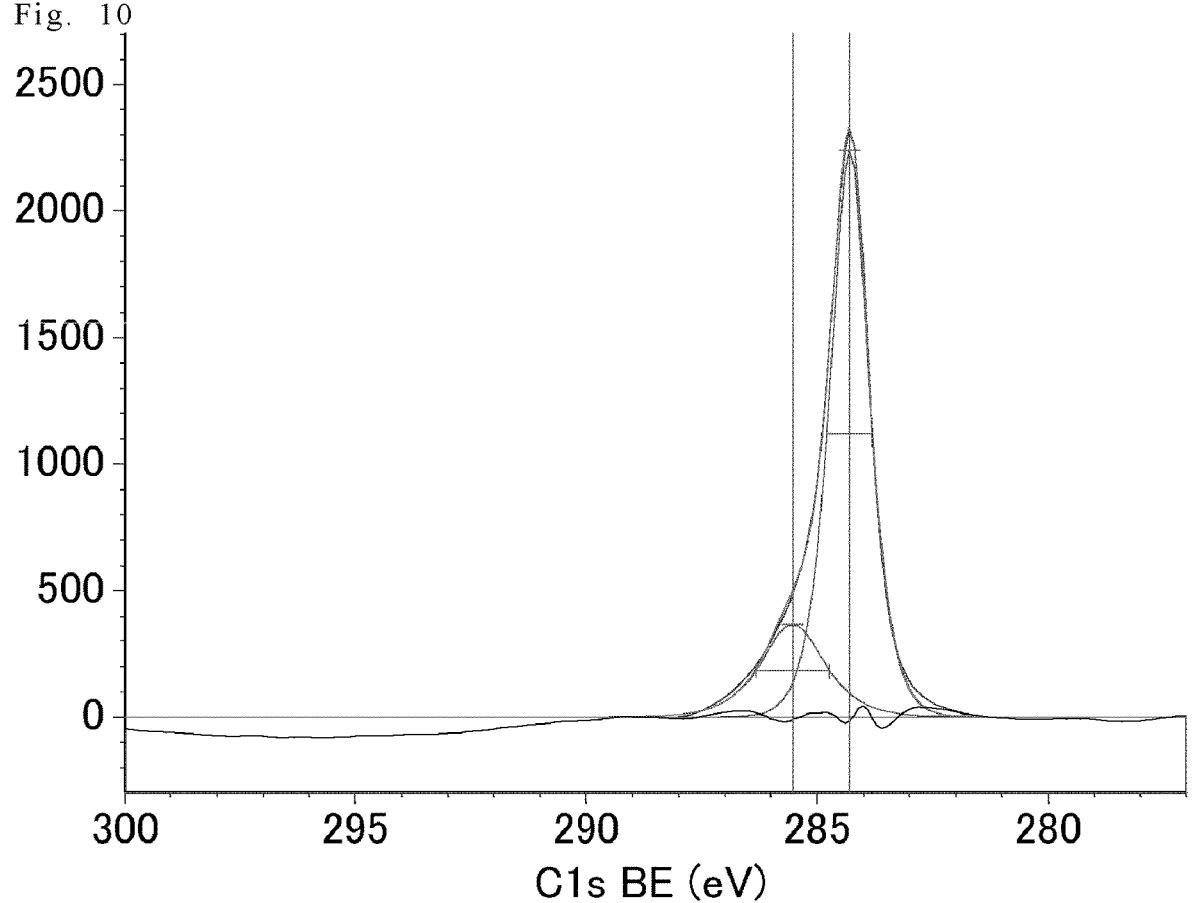
FIG. 10 is a graph showing the result of XPS measurement of natural graphite used as a raw material in Example 1-2.

Subsequently, the whole liquid mixture in the beaker was filtered, and the substance left on the filter paper was washed with 20 g of pouring acetone, and dried. The XRD pattern and the C1s spectrum (narrow scan spectrum) determined by XPS measurement of the resulting dried product are shown in FIGS. 8 and 9, respectively. The C1s spectrum (narrow scan spectrum) determined by XPS measurement of the natural graphite (Z-5F) used as a raw material is shown in FIG. 10. FIG. 8 shows that no peak derived from the (002) plane of graphite is observed (in the vicinity of 2θ=26.5°), and a typical peak derived from graphite oxide (graphene oxide) is observed in the vicinity of 2θ=10° to 12°. In FIG. 10, most of the peaks were derived from a bond between carbon atoms (in the vicinity of 284 to 285 eV), whereas in FIG. 9, the proportion of the peaks derived from a C—O bond (in the vicinity of 286 to 287 eV) and the proportion of the peaks derived from a C=O bond (in the vicinity of 288 to 289 eV) are significantly high. As a result of these analyses, the resulting dried product was confirmed to be graphite oxide (graphene oxide). The sensitivity grade determined by the drop hammer test was 4.

In Examples 1-1 and 1-2, graphite was oxidized by adding a permanganate to the liquid mixture containing graphite and sulfuric acid while maintaining the concentration of heptavalent manganese at 1% by mass or less in 100% by mass of the liquid mixture. Thereby, explosion due to accumulation of heptavalent manganese in the reaction system was able to be prevented and graphite oxide was able to be safely produced with high efficiency. In the above examples, potassium permanganate was used as a permanganate. Still, any permanganate can have the same action and mechanism for producing the effects of the present invention. That is, it is an essential feature of the first aspect of the present invention that graphite is oxidized by adding a permanganate to a liquid mixture containing graphite and sulfuric acid while maintaining the concentration of heptavalent manganese at a predetermined concentration or less in 100% by mass of the liquid mixture. The effects demonstrated in these examples are considered to be achieved when explosion due to accumulation of heptavalent manganese in the reaction system can be prevented. Therefore, advantageous effects of the present invention can be certainly achieved by the method of producing graphite oxide including the essential component of the first aspect of the present invention.

Example 2-1

A 2-L separable flask was charged with 1499.40 g of concentrated sulfuric acid (special grade, produced by Wako Pure Chemical Industries, Ltd.) and 50.40 g of natural graphite (Z-100, flaky graphite, produced by Ito Graphite Co., Ltd.) to prepare a liquid mixture. A given amount of potassium permanganate (special grade, produced by Wako Pure Chemical Industries, Ltd.) was added to the liquid mixture in the separable flask in 12 portions at 17-minute intervals while the liquid mixture was stirred. The amount of the potassium permanganate in each portion was 10.50 g, and the total amount of the potassium permanganate added was 126.00 g. For the second and later additions of the potassium permanganate, the concentration of the heptavalent manganese in the liquid mixture was quantified immediately before each addition by the above-described method of measuring the heptavalent manganese. Specifically, 0.3 g of the liquid mixture was sampled and added to and mixed with 100 g of water by stirring, and the resulting mixture was filtered to obtain a filtrate. Then, the absorbance of the filtrate was measured to quantify the concentration of heptavalent manganese. The result was that the concentration of heptavalent manganese was 0.48% by mass or less at all measurements. This showed that since the amount of the heptavalent manganese contained in each portion of the potassium permanganate (10.50 g) was 0.31% by mass or lower for 100% by mass of the liquid mixture, the concentration of the heptavalent manganese in the liquid mixture was maintained at 0.79% by mass or less from the start to the end of the addition of the potassium permanganate. The temperature of the liquid mixture fell within the range of 17° C. to 27° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture was cooled to room temperature (20° C.), and 167.58 g of water was added to the liquid mixture over 30 minutes. Thus, the viscosity was controlled so that the liquid mixture can be easily handled. The temperature of the liquid mixture was maintained at 50° C. or lower throughout the addition of water.

Subsequently, the liquid mixture was cooled to room temperature (20° C.), and 200 g of the liquid mixture was added to a beaker containing 2000 g of a hydrogen peroxide solution (concentration 0.3%) having room temperature (20° C.) over 2 minutes. From the start to the end of the addition of the liquid mixture, water in the beaker was stirred all the time, and the temperature of the water (liquid temperature) was maintained at 35° C. or lower. Bubble generation was observed upon addition of the liquid mixture, but sudden rise of the liquid level did not occur.

Figure 11:
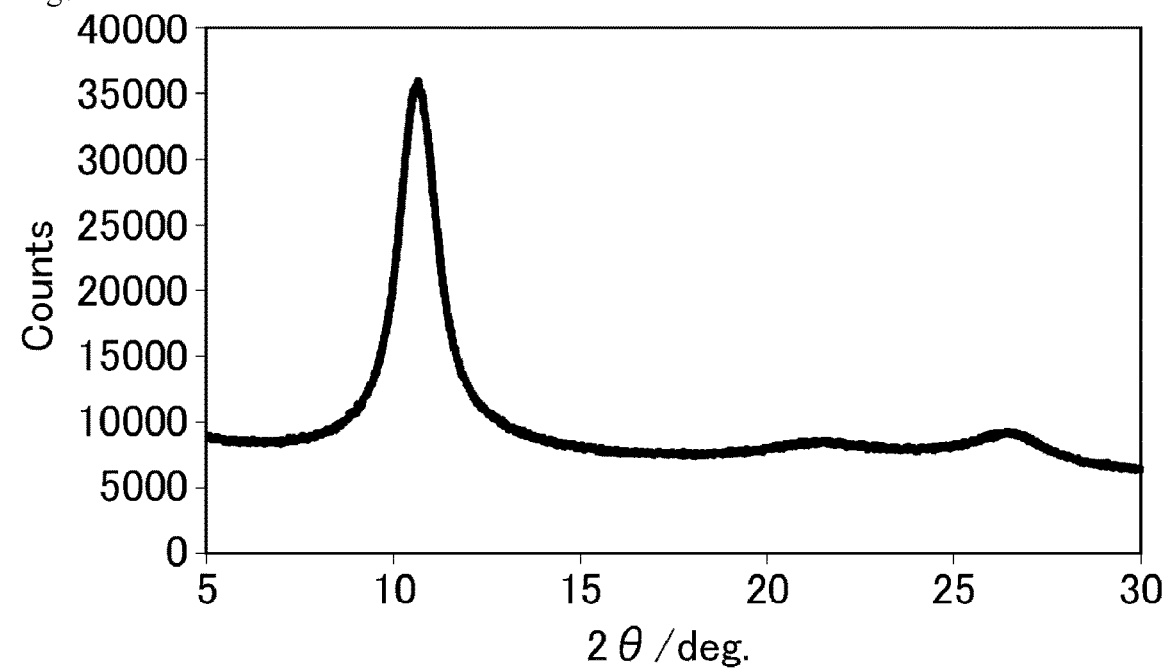
FIG. 11 is a graph showing the result of XRD measurement of the dried product obtained in Example 2-1.
Figure 12:
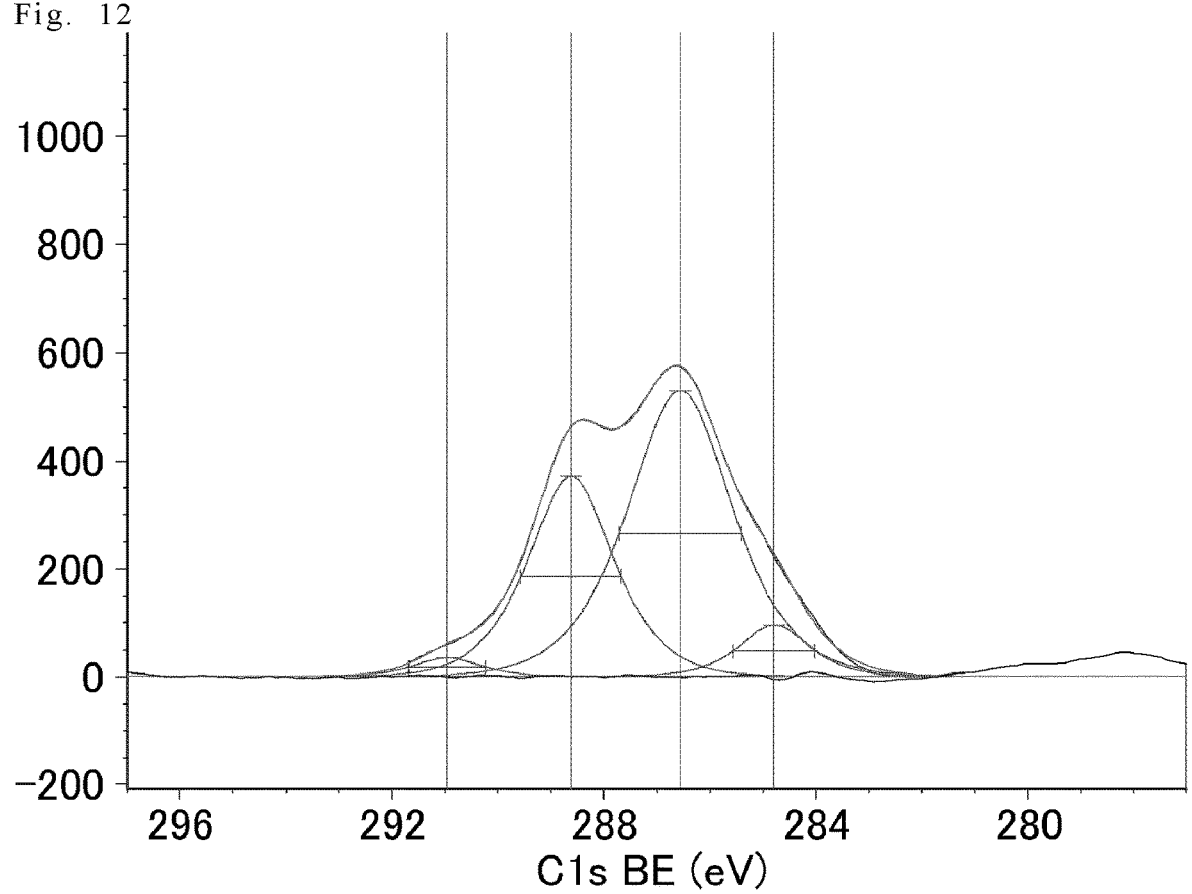
FIG. 12 is a graph showing the result of XPS measurement of the dried product obtained in Example 2-1.
Figure 13:
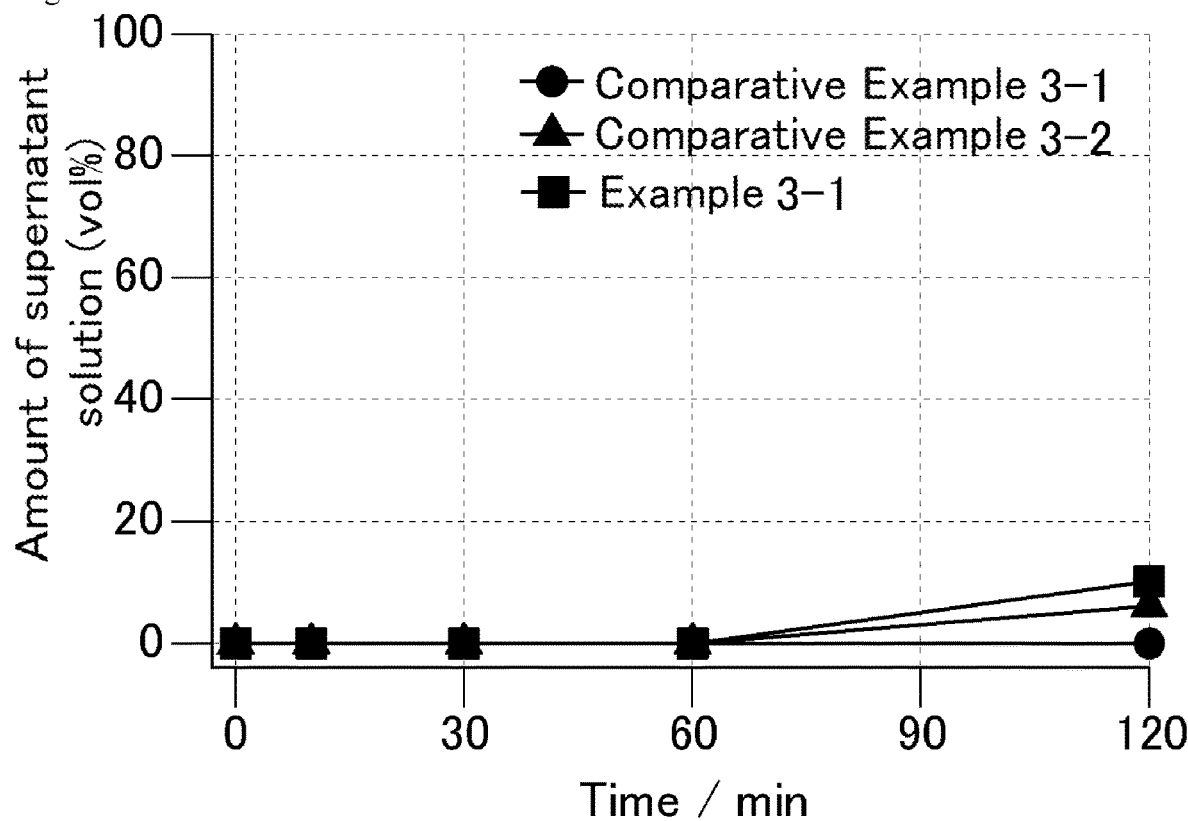
FIG. 13 shows the relationship between the standing time and the amount of the supernatant liquid of the reaction liquid in Example 3-1 and Comparative Examples 3-1 and 3-2.
Figure 14:
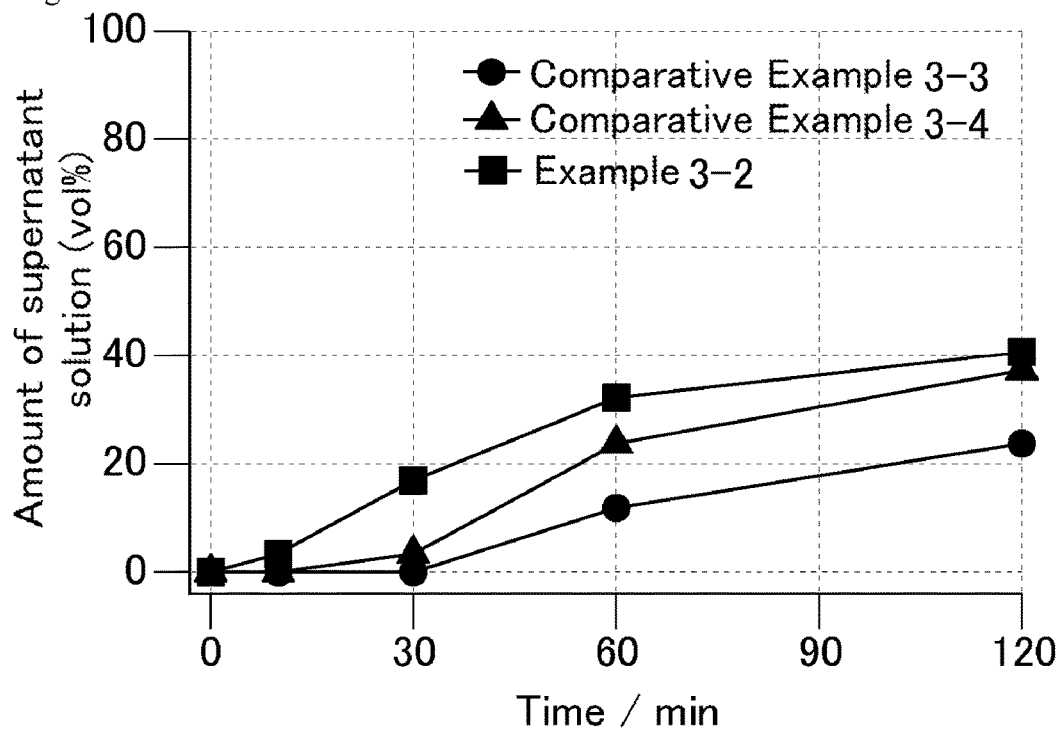
FIG. 14 shows the relationship between the standing time and the amount of the supernatant liquid of the reaction liquid in Example 3-2 and Comparative Examples 3-3 and 3-4.
Figure 15:
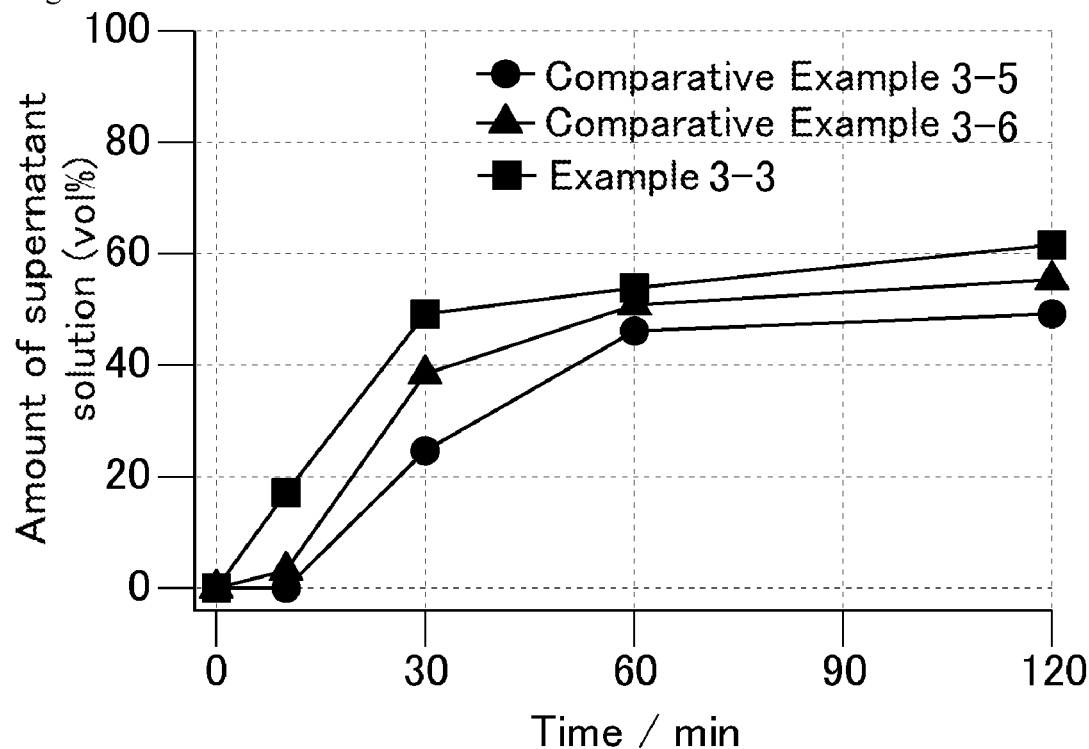
FIG. 15 shows the relationship between the standing time and the amount of the supernatant liquid of the reaction liquid in Example 3-3 and Comparative Examples 3-5 and 3-6.
Figure 16:
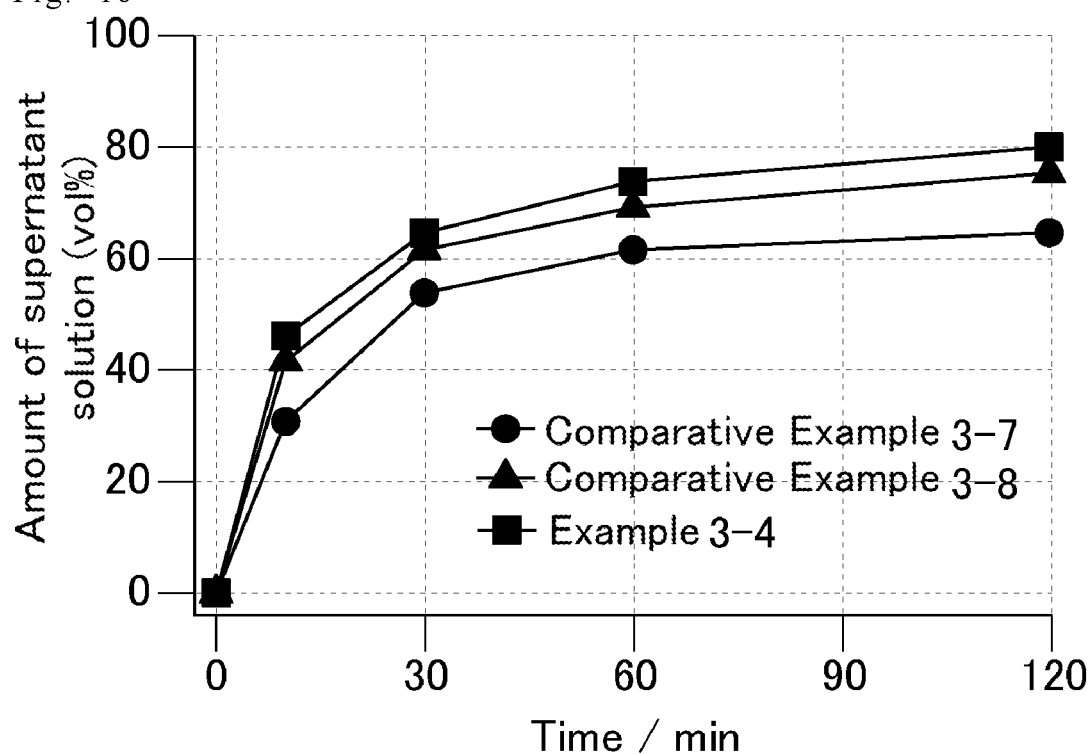
FIG. 16 shows the relationship between the standing time and the amount of the supernatant liquid of the reaction liquid in Example 3-4 and Comparative Examples 3-7 and 3-8.

Next, 500 g of the resulting liquid mixture in the beaker was diluted with 1000 g of water, and the dilution was filtered. The substance left on the filter paper was washed with 300 g of water and dried at 40° C. overnight under reduced pressure. The XRD pattern and the C1s spectrum (narrow scan spectrum) determined by XPS measurement of the resulting dried product are shown in FIGS. 11 and 12, respectively. FIG. 11 shows that a slight peak derived from the (002) plane of graphite is observed (in the vicinity of 2θ=26.5°), and a typical peak derived from graphite oxide (graphene oxide) is significantly observed in the vicinity of 2θ=10° to 12°. In FIG. 5, most of the peaks were derived from a bond between carbon atoms (in the vicinity of 284 to 285 eV), whereas in FIG. 12, the proportion of the peaks derived from a C—O bond (in the vicinity of 286 to 287 eV) and the proportion of the peaks derived from a C=O bond (in the vicinity of 288 to 289 eV) are significantly high. As a result of these analyses, the resulting dried product was confirmed to be graphite oxide (graphene oxide).

Bubble formation upon terminating the reaction can be sufficiently prevented and graphite oxide can be safely produced with high efficiency by adding the liquid mixture obtained in the oxidation step of oxidizing graphite by adding an oxidant to a liquid mixture containing graphite and sulfuric acid to a given amount or more of water in Example 1-1, and by adding the liquid mixture obtained in the oxidation step to a given amount or more of a hydrogen peroxide solution in Example 2-1. In particular, in the present invention, since heat generation and bubble formation can be sufficiently prevented even in the case of adding the liquid mixture to a hydrogen peroxide solution as in Example 2-1, graphite oxide can be produced by a simple operation.

The dried products obtained in Examples 1-1 and 2-1 are high-quality graphite oxides. The reason of this evaluation is as follows.

When oxidation of graphite is insufficient or an oxidized portion is reduced due to, for example, (local) heat generation, XRD data shows a remarkable diffraction peak within the 2θ range of 20° to 30° of, but no such remarkable peak is observed regarding the dried products obtained in Examples 1-1 and 2-1 (see FIGS. 3 and 11). In addition, in the XPS spectra, the peak areas derived from a bond between carbon and oxygen in the vicinity of 286 to 287 eV and in the vicinity of 288 to 289 eV are clearly larger than the peak area derived from a bond between carbons in the vicinity of 284 to 285 eV (see FIGS. 4 and 12). These results demonstrate that the dried products obtained in Examples 1-1 and 2-1 can be evaluated as maintaining a sufficiently oxidized state, and thus these dried products are said to be high-quality graphite oxides.

In the above examples, potassium permanganate was used as an oxidant. Still, any oxidant can have the same action and mechanism for producing the effects of the second aspect of the present invention. That is, it is an essential feature of the second aspect of the present invention that a liquid mixture prepared by adding an oxidant to a liquid mixture containing graphite and sulfuric acid to oxidize the graphite is added to a given amount or more of water or a hydrogen peroxide solution. The effects demonstrated in these examples are considered to be achieved when bubble formation upon terminating the reaction is sufficiently prevented. Therefore, advantageous effects of the present invention can be certainly achieved by the graphite oxide production method including the essential component of the second aspect of the present invention.

Preparation Example 3-1

A corrosion-resistant reactor was charged with 28.75 parts of concentrated sulfuric acid (special grade, produced by Wako Pure Chemical Industries, Ltd.) and 1.00 part of natural graphite (Z-5F, flaky graphite, produced by Ito Graphite Co., Ltd.) to prepare a liquid mixture. Potassium permanganate (special grade, produced by Wako Pure Chemical Industries, Ltd.) was added to the liquid mixture in 20 portions at 15-minute intervals while the liquid mixture was stirred. The amount of the potassium permanganate in each portion was 0.125 parts, and the total amount of the potassium permanganate added was 2.50 parts. For the second and later additions of the potassium permanganate, the concentration of the heptavalent manganese in the liquid mixture was quantified immediately before each addition by the above-described method of measuring the heptavalent manganese. The result was that the concentration of heptavalent manganese was 0.04% by mass or less at all measurements. This showed that since the amount of the heptavalent manganese contained in each portion of the potassium permanganate was 0.15% by mass or less for 100% by mass of the liquid mixture, the concentration of the heptavalent manganese in the liquid mixture was maintained at 0.19% by mass or less from the start to the end of the addition of the potassium permanganate. After the addition of the potassium permanganate, the liquid mixture was heated to 35° C., and aged for 2 hours while the temperature thereof was maintained. Thereafter, 15.48 parts of ion exchange water and 1.77 parts of a 30% hydrogen peroxide solution (special grade, produced by Wako Pure Chemical Industries, Ltd.) were added to the liquid mixture while the temperature of the liquid mixture was maintained at 60° C. or lower to terminate the reaction. Hereinafter, a graphite oxide-containing slurry obtained by such a method is referred to as "post-reaction slurry".

Examples 3-1 to 3-4, Comparative Examples 3-1 to 3-8

A supernatant liquid was separated from the post-reaction slurry prepared in Preparation Example 3-1 to remove about 58 wt % of sulfuric acid contained in the slurry. Thus, purification was performed. A 100-ml screw-cap bottle was charged with given amounts of the post-reaction slurry and ion exchange water, and graphite oxide was precipitated by allowing the slurry to stand at different temperatures to give a clear supernatant liquid. The change of the amount of the clear supernatant liquid over time was measured. Table 1 shows the ratios of the post-reaction slurry to ion exchange water and the temperatures at which the solution was allowed to stand in Examples 3-1 to 3-4 and Comparative Examples 3-1 to 3-8. FIGS. 13 to 16 show the measurement results of the change of the amount of the clear supernatant liquid over time in Examples 3-1 to 3-4 and Comparative Examples 3-1 to 3-8. FIGS. 13 to 16 clearly show that graphite oxide can be rapidly precipitated and efficiently purified at 60° C. at all the ratios of the post-reaction slurry to ion exchange water. In particular, in Examples 3-3 and 3-4 in which the ratio (mass of the graphite used in the oxidation step/mass of reaction liquid containing graphite oxide subjected to the purification step) is 0.0101 or less, the graphite oxide was more rapidly precipitated.

TABLE 1

| Temperature/° C. | Post-reaction slurry/Ion exchange water (g/g) | | | |
|---|---|---|---|---|
| | 75/0 | 50/25 | 37.5/37.5 | 25/50 |
| 0 | Comparative Example 3-1 | Comparative Example 3-3 | Comparative Example 3-5 | Comparative Example 3-7 |
| 25 | Comparative Example 3-2 | Comparative Example 3-4 | Comparative Example 3-6 | Comparative Example 3-8 |
| 60 | Example 3-1 | Example 3-2 | Example 3-3 | Example 3-4 |
| Ratio (mass of graphite used in the oxidation step/mass of reaction solution containing graphite oxide subjected to the purification step) | 0.0202 | 0.0135 | 0.0101 | 0.0067 |

Comparative Example 3-9

A 100-ml screw-cap bottle was charged with 37.5 g of the post-reaction slurry prepared in Preparation Example 3-1 and 37.5 g of ion exchange water, and was allowed to stand at 25° C. for 30 minutes. A clear supernatant given after precipitation of the graphite oxide was drawn out. To the bottle was added ion exchange water in the same weight of the supernatant drawn out, the liquid was allowed to stand for 30 minutes, and only a supernatant was drawn out. A series of these operations was repeated to eliminate the sulfuric acid in the liquid mixture. Thus, purification was performed. At the first to sixth drawing operations, 39 g, 4.4 g, 1.4 g, 21 g, 29 g, and 38 g of supernatants were drawn out, respectively. After repeating the series of these operations six times, the concentration of the sulfuric acid contained in the reaction liquid was calculated by XRF measurement to be 2.4% by weight (% by mass).

Example 3-5

Purification was performed under the same conditions as for Comparative Example 3-9 except that the temperature at which the solution was allowed to stand was changed from room temperature (25° C.) to 60° C. At the first to sixth drawing operations, 43 g, 39 g, 36 g, 43 g, 42 g, and 24 g of supernatants were drawn out, respectively. After repeating the series of these operations six times, the concentration of the sulfuric acid contained in the reaction liquid was calculated by XRF measurement to be 0.33% by weight. This demonstrates that the precipitating speed of the graphite oxide can be increased by standing at 60° C., leading to more further efficient purification.

Comparative Example 3-10

Purification was performed under the same conditions as for Comparative Example 3-9 except that a 100-ml screw-cap bottle was charged with 25 g of the post-reaction slurry prepared in Preparation Example 3-1 and 50 g of ion exchange water. At the first to sixth drawing operations, 52 g, 47 g, 46 g, 0.91 g, 0.61 g, and 8 g of supernatants were drawn out, respectively. After repeating the series of these operations six times, the concentration of the sulfuric acid contained in the reaction liquid was calculated by XRF measurement to be 0.71% by weight.

Example 3-6

Purification was performed under the same conditions as for Comparative Example 3-10 except that the temperature at which the solution was allowed to stand was changed from room temperature (25° C.) to 60° C. At the first to sixth drawing operations, 58 g, 53 g, 52 g, 31 g, 25 g, and 25 g of supernatants were drawn out, respectively. After repeating the series of these operations six times, the concentration of the sulfuric acid contained in the reaction liquid was calculated by XRF measurement to be 0.10% by weight. This demonstrates that the precipitating speed of the graphite oxide can be increased by standing at 60° C., leading to more further efficient purification.

Example 4-1

A 0.5-L separable flask was charged with 289.80 g of concentrated sulfuric acid (special grade, produced by Wako Pure Chemical Industries, Ltd.) and 6.30 g of natural graphite (Z-5F, flaky graphite, produced by Ito Graphite Co., Ltd.) to prepare a liquid mixture. The Raman spectrum and the XRD pattern of the natural graphite (Z-5F) are shown in FIGS. 6 and 7, respectively. FIG. 6 shows that the ratio of the peak intensity of the D band to the peak intensity of the G band in the Raman spectrum was 0.21, and FIG. 7 shows that the spacing of the (002) planes of graphite was 3.38 Å determined by X-ray diffraction. The natural graphite (Z-5F) had an average particle size of 3.38 μm and a specific surface area of 8.24 m²/g.

A given amount of potassium permanganate (special grade, produced by Wako Pure Chemical Industries, Ltd.) was added to the liquid mixture in the separable flask in 10 portions at 17-minute intervals while the liquid mixture was stirred. The amount of the potassium permanganate in each portion was 1.575 g, and the total amount of the potassium permanganate added was 15.75 g. For the second and later additions of the potassium permanganate, the concentration of the heptavalent manganese in the liquid mixture was quantified immediately before each addition by the above-described method of measuring the concentration of the heptavalent manganese. Specifically, 0.2 g of the liquid mixture was sampled and added to and mixed with 70 g of water by stirring, and the resulting mixture was filtered to obtain a filtrate. Then, the absorbance of the filtrate was measured to quantify the concentration of heptavalent manganese. The result was that the concentration of heptavalent manganese was 0.50% by mass or less at all measurements. This showed that since the amount of the heptavalent manganese contained in each portion of the potassium permanganate (1.575 g) was 0.19% by mass or less for 100% by mass of the liquid mixture, the concentration of the heptavalent manganese in the liquid mixture was maintained at 0.69% by mass or less from the start to the end of the addition of the potassium permanganate. The temperature of the liquid mixture fell within the range of 24° C. to 30° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture cooled to room temperature (20° C.) was centrifuged to be separated into a supernatant component and a precipitate component, and the supernatant component was recovered in a separable flask. The amount of the supernatant component recovered was 121.42 g. As a result of the analysis using an ICP emission spectrophotometer (produced by Thermo Fisher Scientific K.K., iCAP 6500 Duo), the manganese concentration in the supernatant component was 3.2 ppm. A liquid mixture prepared by adding 6.30 g of natural graphite (Z-5F) to the recovered supernatant component was stored in a refrigerator (10° C. or lower) for 12 days.

The precipitate component obtained by centrifugation was added little by little into a beaker containing about 300 g of water while the temperature of the liquid was maintained at 45° C. or lower, whereby slurry was obtained. To the slurry was added gradually 17.8 g of a 30% hydrogen peroxide solution (special grade, produced by Wako Pure Chemical Industries, Ltd.) while the slurry was stirred.

Figure 17:
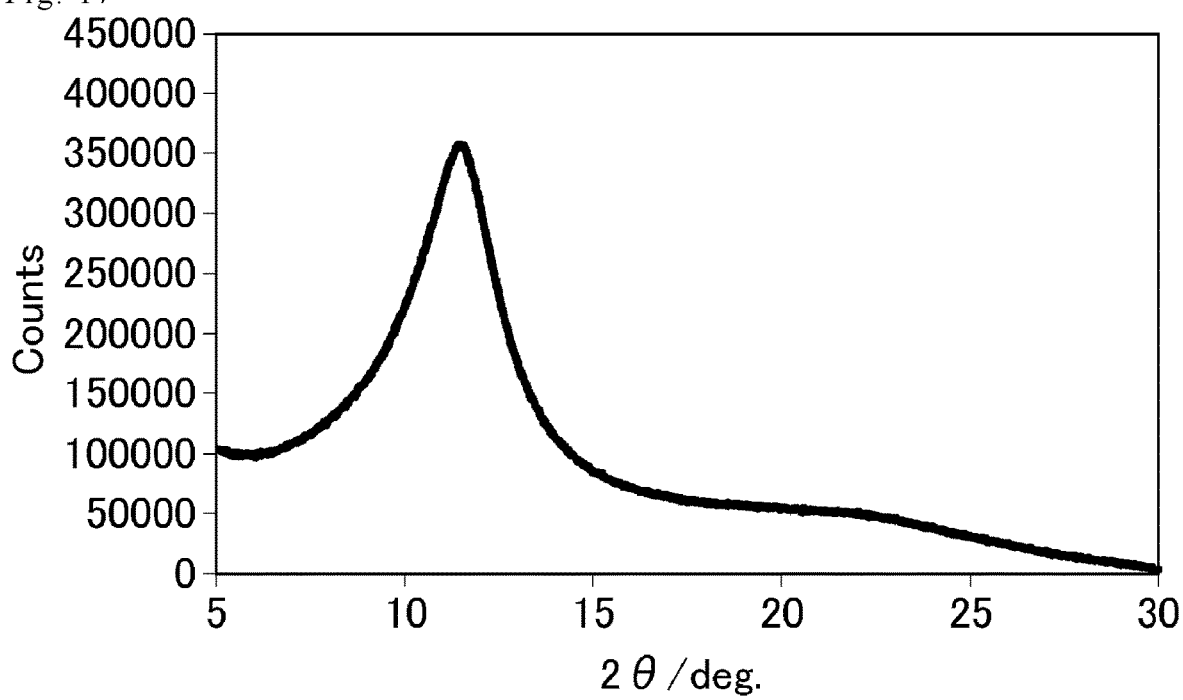
FIG. 17 shows an XRD pattern of the dried product obtained in Example 4-1.
Figure 18:
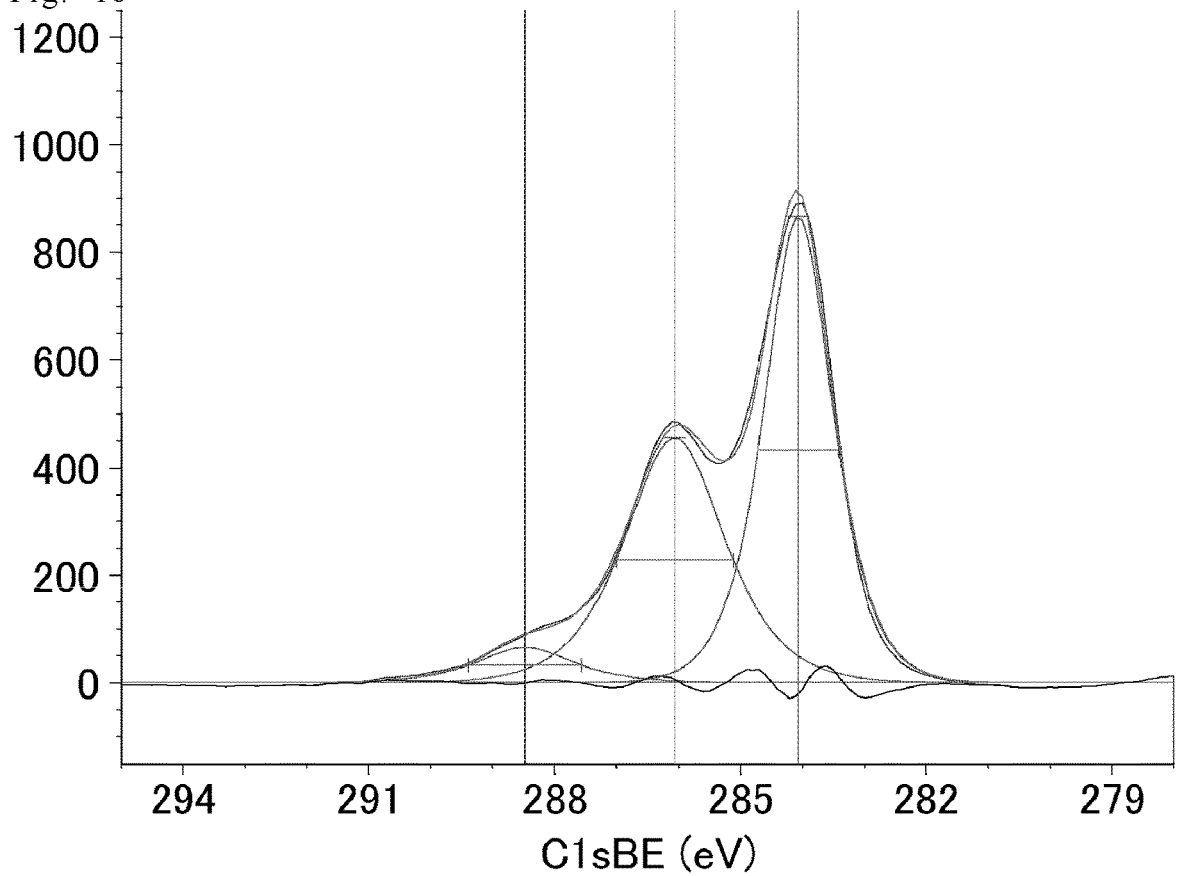
FIG. 18 shows a C1s spectrum (narrow scan spectrum) of the dried product obtained in Example 4-1 determined by XPS measurement.

Next, 10 parts by mass of the resulting slurry in the beaker was diluted with 90 parts by mass of water, and the dilution was filtered. The substance left on the filter paper was washed with 10 parts by mass of water, and dried at 40° C. overnight under reduced pressure. The XRD pattern and the C1s spectrum (narrow scan spectrum) determined by XPS measurement of the resulting dried product are shown in FIGS. 17 and 18, respectively. The C1s spectrum (narrow scan spectrum) determined by XPS measurement of the natural graphite (Z-5F) used as a raw material is shown in FIG. 10. FIG. 17 shows that no peak derived from the (002) plane of graphite is observed (in the vicinity of 2θ=26.5°), and a typical peak derived from graphite oxide (graphene oxide) is observed in the vicinity of 2θ=10° to 12°. In FIG. 10, most of the peaks were derived from a bond between carbon atoms (in the vicinity of 284 to 285 eV), whereas in FIG. 18, the proportion of the peaks derived from a C—O bond (in the vicinity of 286 to 287 eV) and the proportion of the peaks derived from a C=O bond (in the vicinity of 288 to 289 eV) are significantly high. As a result of these analyses, the resulting dried product was confirmed to be graphite oxide (graphene oxide).

Concentrated sulfuric acid (special grade, produced by Wako Pure Chemical Industries, Ltd.) was added to the liquid mixture in the separable flask after storage in the refrigerator (10° C. or lower) for 12 days to prepare 296.1 g of a liquid mixture.

A given amount of potassium permanganate (special grade, produced by Wako Pure Chemical Industries, Ltd.) was added to the liquid mixture in the separable flask in 10 portions at 17-minute intervals while the liquid mixture was stirred. The amount of the potassium permanganate in each portion was 1.575 g, and the total amount of the potassium permanganate added was 15.75 g. For the second and later additions of the potassium permanganate, the concentration of the heptavalent manganese in the liquid mixture was quantified immediately before each addition by the above-described method of measuring the concentration of the heptavalent manganese. Specifically, 0.2 g of the liquid mixture was sampled and added to and mixed with 70 g of water by stirring, and the resulting mixture was filtered to obtain a filtrate. Then, the absorbance of the filtrate was measured to quantify the concentration of heptavalent manganese. The result was that the concentration of heptavalent manganese was 0.50% by mass or less at all measurements. This showed that since the amount of the heptavalent manganese contained in each portion of the potassium permanganate (1.575 g) was 0.19% by mass or less for 100% by mass of the liquid mixture, the concentration of the heptavalent manganese in the liquid mixture was maintained at 0.69% by mass or less from the start to the end of the addition of the potassium permanganate. The temperature of the liquid mixture fell within the range of 24° C. to 30° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture was cooled to room temperature (20° C.), and 200 g of the liquid mixture was added to a beaker containing 1000 g of water having room temperature (20° C.) over 15 minutes. From the start to the end of the addition of the liquid mixture, water in the beaker was stirred all the time, and the temperature of the water (liquid temperature) was maintained at 45° C. or lower. Subsequently, 11.08 g of a 30% hydrogen peroxide solution (special grade, produced by Wako Pure Chemical Industries, Ltd.) was added over 1.5 minutes. Bubble generation was observed upon addition of the hydrogen peroxide solution, but sudden rise of the liquid level did not occur.

Figure 19:
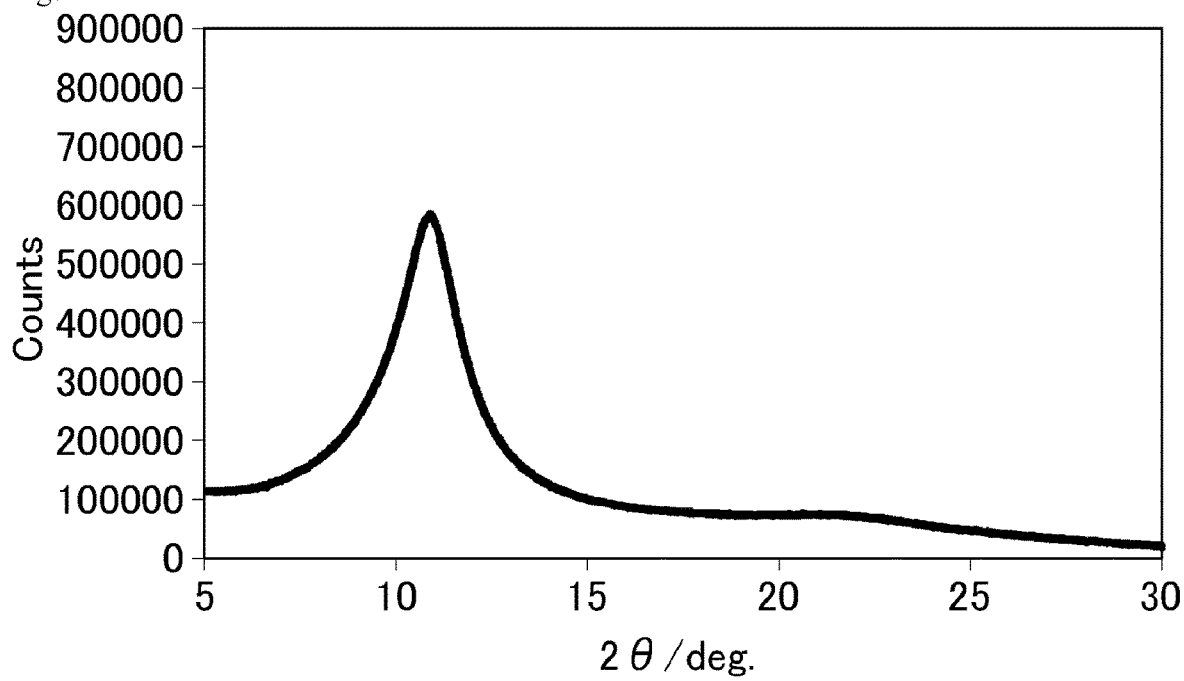
FIG. 19 shows an XRD pattern of the dried product obtained in Example 4-1.
Figure 20:
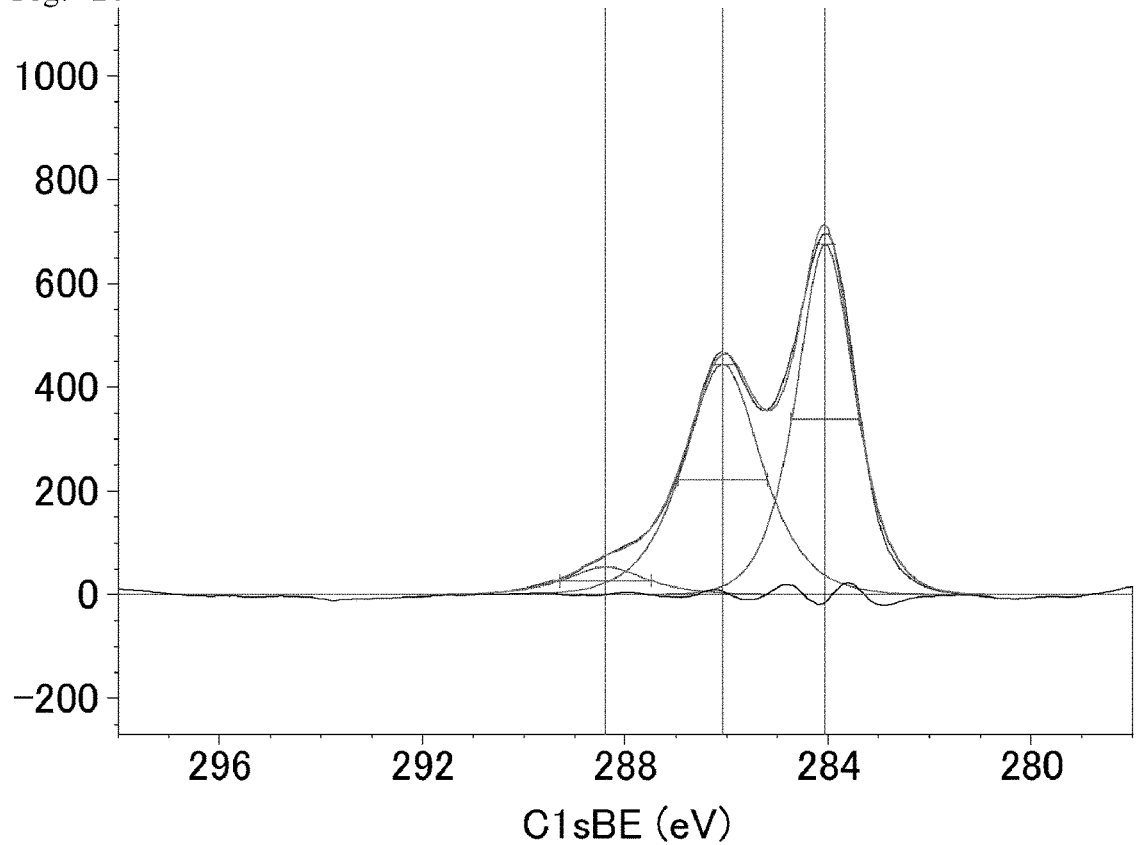
FIG. 20 shows a C1s spectrum (narrow scan spectrum) of the dried product obtained in Example 4-1 determined by XPS measurement.

Next, 200 g of the resulting liquid mixture in the beaker was diluted with 1000 g of water, and the dilution was filtered. The substance left on the filter paper was washed with 200 g of water and dried at 40° C. overnight under reduced pressure. The XRD pattern and the C1s spectrum (narrow scan spectrum) determined by XPS measurement of the resulting dried product are shown in FIGS. 19 and 20, respectively. FIG. 19 shows that no peak derived from the (002) plane of graphite is observed (in the vicinity of 2θ=26.5°), and a typical peak derived from graphite oxide (graphene oxide) is observed in the vicinity of 2θ=10° to 12°. In FIG. 10, most of the peaks were derived from a bond between carbon atoms (in the vicinity of 284 to 285 eV), whereas in FIG. 20, the proportion of the peaks derived from a C—O bond (in the vicinity of 286 to 287 eV) and the proportion of the peaks derived from a C=O bond (in the vicinity of 288 to 289 eV) are significantly high. As a result of these analyses, the resulting dried product was confirmed to be graphite oxide (graphene oxide).

Example 4-2

A 0.5-L separable flask was charged with 289.80 g of concentrated sulfuric acid (special grade, produced by Wako Pure Chemical Industries, Ltd.) and 6.30 g of natural graphite (Z-5F, flaky graphite, produced by Ito Graphite Co., Ltd.) to prepare a liquid mixture.

A given amount of potassium permanganate (special grade, produced by Wako Pure Chemical Industries, Ltd.) was added to the liquid mixture in the separable flask in 10 portions at 17-minute intervals while the liquid mixture was stirred. The amount of the potassium permanganate in each portion was 1.575 g, and the total amount of the potassium permanganate added was 15.75 g. For the second and later additions of the potassium permanganate, the concentration of the heptavalent manganese in the liquid mixture was quantified immediately before each addition by the above-described method of measuring the heptavalent manganese. Specifically, 0.2 g of the liquid mixture was sampled and added to and mixed with 70 g of water by stirring, and the resulting mixture was filtered to obtain a filtrate. Then, the absorbance of the filtrate was measured to quantify the concentration of heptavalent manganese. The result was that the concentration of heptavalent manganese was 0.50% by mass or less at all measurements. This showed that since the amount of the heptavalent manganese contained in each portion of the potassium permanganate (1.575 g) was 0.19% by mass or less for 100% by mass of the liquid mixture, the concentration of the heptavalent manganese in the liquid mixture was maintained at 0.69% by mass or less from the start to the end of the addition of the potassium permanganate. The temperature of the liquid mixture fell within the range of 24° C. to 30° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture was cooled to room temperature (20° C.), and 40 g of water was added to the liquid mixture while the temperature of the liquid was maintained at 45° C. or lower. Subsequently, the liquid mixture was centrifuged to be separated into a supernatant component and a precipitate component, and the supernatant component was recovered in a separable flask. The amount of the supernatant component recovered was 208.73 g. As a result of the analysis using an ICP emission spectrophotometer (produced by Thermo Fisher Scientific K.K., iCAP 6500 Duo), the manganese concentration in the supernatant component was 26488 ppm. A liquid mixture prepared by adding 6.30 g of natural graphite (Z-5F) to the recovered supernatant component was stored in a refrigerator (10° C. or lower) for 12 days.

Concentrated sulfuric acid (special grade, produced by Wako Pure Chemical Industries, Ltd.) was added to the liquid mixture in a separable flask after storage in a refrigerator (10° C. or lower) for 12 days to prepare 296.1 g of a liquid mixture.

A given amount of potassium permanganate (special grade, produced by Wako Pure Chemical Industries, Ltd.) was added to the liquid mixture in the separable flask in 10 portions at 17-minute intervals while the liquid mixture was stirred. The amount of the potassium permanganate in each portion was 1.575 g, and the total amount of the potassium permanganate added was 15.75 g. For the second and later additions of the potassium permanganate, the concentration of the heptavalent manganese in the liquid mixture was quantified immediately before each addition by the above-described method of measuring the heptavalent manganese. Specifically, 0.2 g of the liquid mixture was sampled and added to and mixed with 70 g of water by stirring, and the resulting mixture was filtered to obtain a filtrate. Then, the absorbance of the filtrate was measured to quantify the concentration of heptavalent manganese. The result was that the concentration of heptavalent manganese was 0.50% by mass or less at all measurements. This showed that since the amount of the heptavalent manganese contained in each portion of the potassium permanganate (1.575 g) was 0.19% by mass or less for 100% by mass of the liquid mixture, the concentration of the heptavalent manganese in the liquid mixture was maintained at 0.69% by mass or less from the start to the end of the addition of the potassium permanganate. The temperature of the liquid mixture fell within the range of 24° C. to 30° C. from the start to the end of the addition of the potassium permanganate.

After the addition of the potassium permanganate, the liquid mixture was heated to 35° C., and after the temperature thereof reached 35° C., the liquid mixture was continuously stirred for 2 hours while the temperature was maintained at 35° C. Thereafter, the liquid mixture was cooled to room temperature (20° C.), and 200 g of the liquid mixture was added to a beaker containing 1000 g of water having room temperature (20° C.) over 15 minutes. From the start to the end of the addition of the liquid mixture, water in the beaker was stirred all the time, and the temperature of the water (liquid temperature) was maintained at 45° C. or lower. Subsequently, 11.08 g of a 30% hydrogen peroxide solution (special grade, produced by Wako Pure Chemical Industries, Ltd.) was added over 1.5 minutes. Bubble generation was observed upon addition of the hydrogen peroxide solution, but sudden rise of the liquid level did not occur.

Figure 21:
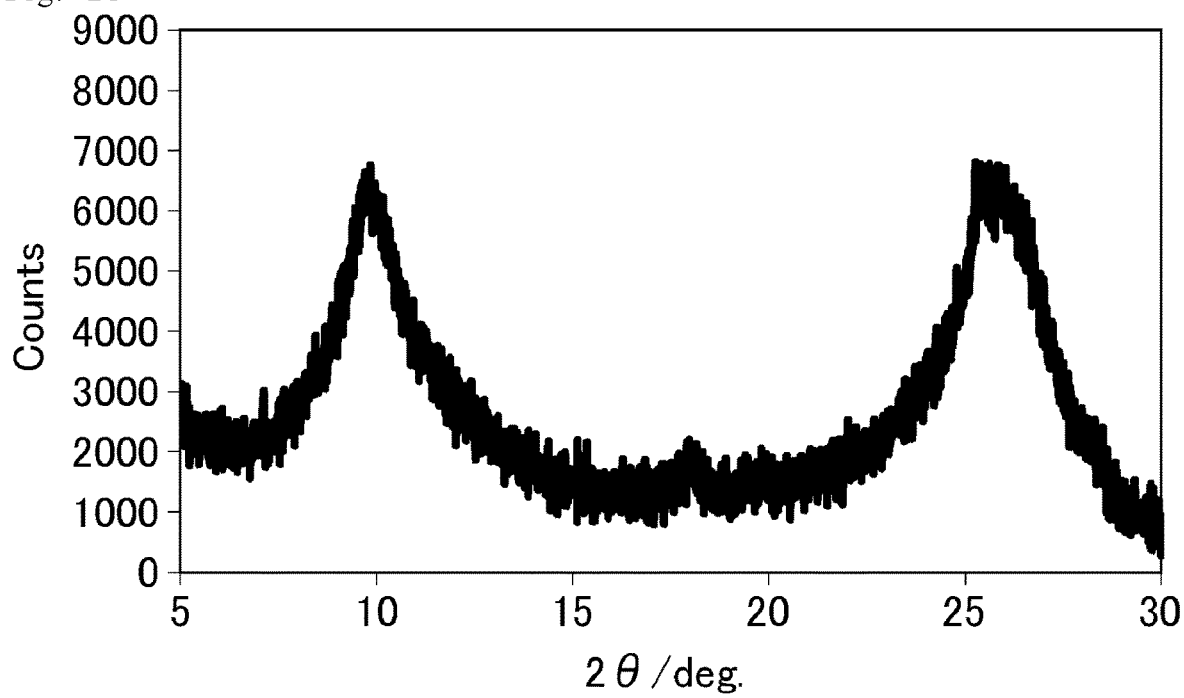
FIG. 21 shows an XRD pattern of the dried product obtained in Example 4-2.
Figure 22:
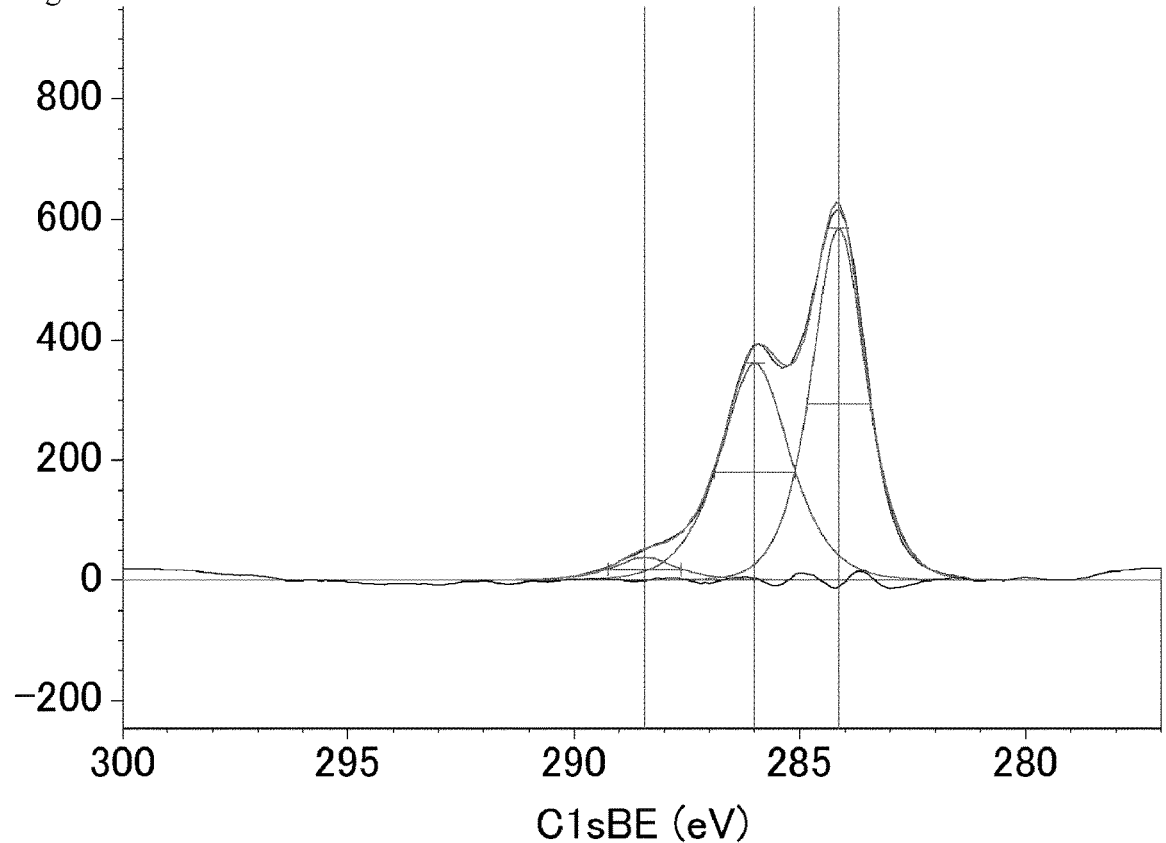
FIG. 22 shows a C1s spectrum (narrow scan spectrum) of the dried product obtained in Example 4-2 determined by XPS measurement.

Next, 200 g of the resulting liquid mixture in the beaker was diluted with 1000 g of water, and the dilution was filtered. The substance left on the filter paper was washed with 200 g of water and dried at 40° C. overnight under reduced pressure. The XRD pattern and the C1s spectrum (narrow scan spectrum) determined by XPS measurement of the resulting dried product are shown in FIGS. 21 and 22, respectively. FIG. 21 shows that a peak derived from the (002) plane of graphite is observed (in the vicinity of $2\theta=26.5°$), and a typical peak derived from graphite oxide (graphene oxide) is observed in the vicinity of $2\theta=10°$ to 12°. In FIG. 10, most of the peaks were derived from a bond between carbon atoms (in the vicinity of 284 to 285 eV), whereas in FIG. 22, the proportion of the peaks derived from a C—O bond (in the vicinity of 286 to 287 eV) and the proportion of the peaks derived from a C=O bond (in the vicinity of 288 to 289 eV) are significantly high. These analysis results demonstrate that the resulting dried product is a mixture of graphite and graphite oxide (graphene oxide).

The invention claimed is:

1. A method for producing graphite oxide by oxidizing graphite, the method comprising:
   oxidizing graphite by adding a permanganate to a liquid mixture containing graphite and sulfuric acid while maintaining the concentration of heptavalent manganese at 1% by mass or less in 100% by mass of the liquid mixture; and
   adding the liquid mixture obtained in the oxidation step to water or a hydrogen peroxide solution in an amount of 120% by mass or more for 100% by mass of the liquid mixture obtained in the oxidation to terminate the oxidation step,
   wherein a mass ratio of sulfuric acid to graphite is 25 to 60 in the liquid mixture used in a reaction in the oxidation step.

2. The method for producing graphite oxide according to claim 1, the method further comprising:
   purifying graphite oxide obtained in the oxidation step, the purification step comprising the step of allowing a graphite oxide-containing liquid to stand at 30° C. to 90° C. and then separating a supernatant liquid.

3. The method for producing graphite oxide according to claim 1, the method further comprising:
   recovering the sulfuric acid used in the reaction in the oxidation step;
   mixing the recovered sulfuric acid with graphite; and
   oxidizing graphite by adding an oxidant to a liquid mixture obtained in the mixing step.

4. The method for producing graphite oxide according to claim 1,
wherein the total amount of the permanganate added in the oxidation step is 50% to 500% by mass for 100% by mass of the graphite in the liquid mixture used in the reaction in the oxidation step.

5. The method for producing graphite oxide according to claim 1,
wherein the oxidation step comprises adding a permanganate while maintaining the temperature variation of the liquid mixture used in the reaction in the oxidation step within 25° C.

6. The method for producing graphite oxide according to claim 1,
wherein the graphite used in the reaction in the oxidation step has a Raman spectrum in which the ratio of the peak intensity of the D band to the peak intensity of the G band is 0.4 or less.

7. The method for producing graphite oxide according to claim 1,
wherein the graphite used in the reaction in the oxidation step has a spacing of the (002) planes of 3.3 Å or larger and 3.4 Å or smaller determined by X-ray diffraction in crystals.

8. The method for producing graphite oxide according to claim 1,
wherein the graphite used in the reaction in the oxidation step has an average particle size of 3 μm or greater and 80 μm or smaller.

9. The method for producing graphite oxide according to claim 1,
wherein the graphite used in the reaction in the oxidation step has a specific surface area of 3 $m^2/g$ or larger and 10 $m^2/g$ or smaller.

10. The method for producing graphite oxide according to claim 1,
wherein the addition step of the liquid mixture comprises adding the liquid mixture obtained in the oxidation step to a hydrogen peroxide solution.

11. The method for producing graphite oxide according to claim 1,
wherein the concentration of the hydrogen peroxide solution in the addition step of the liquid mixture is 10% by mass or less.

12. The method for producing graphite oxide according to claim 1,
wherein the addition step of the liquid mixture comprises adding the liquid mixture obtained in the oxidation step while maintaining the temperature of the water or the hydrogen peroxide solution at 60° C. or lower.

13. The method for producing graphite oxide according to claim 1,
wherein the addition step of the liquid mixture comprises adding the liquid mixture obtained in the oxidation step while maintaining the temperature variation of the water or the hydrogen peroxide solution within 40° C.

14. The method for producing graphite oxide according to claim 2,
wherein the graphite oxide-containing liquid is allowed to stand at 30° C. to 90° C. for 0.1 to 24 hours.

15. The method for producing graphite oxide according to claim 2,
wherein the ratio between the mass of the graphite used in the oxidation step and the mass of the graphite oxide-containing liquid subjected to the purification step is 0.0001 to 0.05.

16. The method for producing graphite oxide according to claim 3,
wherein the oxidant is a permanganate.

17. The method for producing graphite oxide according to claim 16,
wherein the sulfuric acid used in the mixing step has a manganese concentration of 10000 ppm or lower.

18. A method for producing reduced graphite oxide by reducing graphite oxide, the method comprising:
oxidizing graphite by adding a permanganate to a liquid mixture containing graphite and sulfuric acid while maintaining the concentration of heptavalent manganese at 1% by mass or less in 100% by mass of the liquid mixture, and adding the liquid mixture obtained in the oxidation step to water or a hydrogen peroxide solution in an amount of 120% by mass or more for 100% by mass of the liquid mixture to terminate the oxidation step
purifying graphite oxide obtained in the oxidation step; and
reducing graphite oxide obtained in the purification step,
wherein the purification step comprises allowing a graphite oxide-containing liquid to stand at 30° C. to 90° C. and then separating a supernatant liquid, and
the mass ratio of sulfuric acid to graphite is 25 to 60 in the liquid mixture used in the reaction in the oxidation step.

19. A method for storing sulfuric acid, the method comprising:
storing sulfuric acid recovered after use in a method for producing graphite oxide by oxidizing graphite by adding a permanganate to a liquid mixture containing graphite and sulfuric acid while maintaining the concentration of heptavalent manganese at 1% by mass or less in 100% by mass of the liquid mixture, and adding the liquid mixture obtained in the oxidation step to water or a hydrogen peroxide solution in an amount of 120% by mass or more for 100% by mass of the liquid mixture to terminate the oxidation step.
wherein the storing method comprises adding graphite to the recovered sulfuric acid and storing them, and
the mass ratio of sulfuric acid to graphite is 25 to 60 in the liquid mixture used in the reaction in the oxidation step.

20. The method for storing sulfuric acid according to claim 19,
wherein the storing step comprises maintaining the temperature of a liquid prepared by adding graphite to the recovered sulfuric acid at 20° C. or lower.

* * * * *